(12) United States Patent
Inoue et al.

(10) Patent No.: US 12,110,348 B2
(45) Date of Patent: Oct. 8, 2024

(54) CARBOXYL GROUP-CONTAINING NITRILE RUBBER

(71) Applicant: ZEON CORPORATION, Tokyo (JP)

(72) Inventors: Sayaka Inoue, Tokyo (JP); Kentaro Ono, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 673 days.

(21) Appl. No.: 17/419,166

(22) PCT Filed: Dec. 25, 2019

(86) PCT No.: PCT/JP2019/050857
§ 371 (c)(1),
(2) Date: Jun. 28, 2021

(87) PCT Pub. No.: WO2020/138184
PCT Pub. Date: Jul. 2, 2020

(65) Prior Publication Data
US 2022/0106415 A1   Apr. 7, 2022

(30) Foreign Application Priority Data
Dec. 28, 2018 (JP) .................................. 2018-248414

(51) Int. Cl.
*C08C 19/02* (2006.01)
(52) U.S. Cl.
CPC .................................. *C08C 19/02* (2013.01)
(58) Field of Classification Search
CPC ... C08C 1/04; C08C 3/02; C08C 19/02; C08F 236/12
USPC .......................................................... 525/329.3
See application file for complete search history.

(56) References Cited

U.S. PATENT DOCUMENTS

| 2017/0253729 A1 | 9/2017 | Nakashima |
| 2020/0031955 A1 | 1/2020 | Hierai et al. |

FOREIGN PATENT DOCUMENTS

| JP | 2009-179686 A | 8/2009 |
| JP | 2015-017168 A | 1/2015 |
| JP | 2016-043528 A | 4/2016 |
| JP | 2018-150441 A | 9/2018 |
| WO | 2016/031848 A1 | 3/2016 |
| WO | 2018/180978 A1 | 10/2018 |

OTHER PUBLICATIONS

Mar. 13, 2020 International Search Report issued in International Patent Application No. PCT/JP2019/050857.
Sep. 14, 2022 extended Search Report issued in European Patent Application No. 19904686.3.
Oct. 11, 2022 Office Action issued in Indian Patent Application No. 202117028682.
Jul. 11, 2023 Office Action issued in Indian Patent Application No. 202117028682.

*Primary Examiner* — Fred M Teskin
(74) *Attorney, Agent, or Firm* — Oliff PLC

(57) ABSTRACT

A carboxyl group-containing nitrile rubber having an iodine value of 120 or less, wherein the content of sodium is 1500 ppm by weight or less, the total content of calcium, magnesium, and aluminum is 350 ppm by weight or less, and the storage elastic modulus at 140° C. is 350 kPa or more.

8 Claims, 5 Drawing Sheets

CARBOXYL GROUP-CONTAINING NITRILE RUBBER

TECHNICAL FIELD

The present invention relates to a carboxyl group-containing nitrile rubber and more specifically to a carboxyl group-containing nitrile rubber that has good productivity and excellent formability (in particular, mold contamination resistance) and that can give a cross-linked rubber excellent in the water resistance (in particular, LLC solution resistance) and the compression set resistance.

BACKGROUND ART

Nitrile rubber (acrylonitrile-butadiene copolymer rubber) has been conventionally used as materials of rubber components for automobiles, such as hoses and tubes, by taking advantage of the oil resistance, mechanical properties, chemical resistance, etc. Moreover, hydrogenated nitrile rubber (hydrogenated acrylonitrile-butadiene copolymer rubber) obtained by hydrogenating carbon-carbon double bonds in the polymer main chain of nitrile rubber is used for rubber components such as belts, hoses, and diaphragms because of further excellent heat resistance.

A method used for producing such nitrile rubber includes polymerizing a monomer mixture, coagulating the obtained polymer, and further dewatering the coagulated polymer. Specifically, nitrile rubber is produced through polymerizing a monomer mixture by an emulsion polymerization method or a solution polymerization method, coagulating the obtained polymer to form a water-containing crumbs comprising crumb-like nitrile rubber, and dewatering the water-containing crumbs.

For example, Patent Document 1 discloses a method of dewatering the water-containing crumbs using a twin-screw extruder. The productivity can be improved by using a twin-screw extruder as in the technique described in Patent Document 1, but in a conventional method using a twin-screw extruder, such as the method described in Patent Document 1, the water resistance of the obtained nitrile rubber is not necessarily sufficient. For example, the obtained nitrile rubber may not be suitable for an application in which water resistance is required under a relatively low temperature environment, more specifically, an application for sealing materials and the like for sealing an aqueous coolant in a cold region.

In particular, a coolant capable of cooling at a lower temperature, such as a Long Life Coolant (LLC) solution, may be used as the aqueous coolant, and the sealing material or the like for sealing a container containing such an LLC solution is required to have more excellent water resistance.

RELATED ART

Patent Documents

Patent Document 1: JP2016-43528A

SUMMARY OF INVENTION

Problem to be Solved by the Invention

The present invention has been made in consideration of such circumstances, and an object of the present invention is to provide a carboxyl group-containing nitrile rubber that has good productivity and excellent formability (in particular, mold contamination resistance) and that can give a cross-linked rubber excellent in the water resistance (in particular, LLC solution resistance) and the compression set resistance.

Means for Solving the Problem

As a result of extensive studies to achieve the above object, the present inventors have found that the above object can be achieved through suppressing the content of sodium and the total content of calcium, magnesium, and aluminum to respective specific amounts or less in a carboxyl group-containing nitrile rubber that has an iodine value of 120 or less and keeping the storage elastic modulus at 140° C. within a specific range. Thus, the present inventors have completed the present invention.

That is, the present invention provides a carboxyl group-containing nitrile rubber having an iodine value of 120 or less, wherein the content of sodium is 1500 ppm by weight or less, the total content of calcium, magnesium, and aluminum is 350 ppm by weight or less, and the storage elastic modulus at 140° C. is 350 kPa or more.

In the carboxyl group-containing nitrile rubber according to the present invention, a methyl ethyl ketone insoluble content is preferably 40 w % or less.

In the carboxyl group-containing nitrile rubber according to the present invention, the content of sodium is preferably 10 ppm by weight or more.

In the carboxyl group-containing nitrile rubber according to the present invention, the total content of calcium, magnesium, and aluminum is preferably 1.5 ppm by weight or more.

The carboxyl group-containing nitrile rubber according to the present invention preferably contains an $\alpha,\beta$-ethylenically unsaturated nitrile monomer unit and an $\alpha,\beta$-ethylenically unsaturated dicarboxylic acid monoester monomer unit.

The carboxyl group-containing nitrile rubber according to the present invention preferably contains the $\alpha,\beta$-ethylenically unsaturated nitrile monomer unit, the $\alpha,\beta$-ethylenically unsaturated dicarboxylic acid monoester monomer unit, a conjugated diene monomer unit which includes a saturated unit thereof, and an $\alpha,\beta$-ethylenically unsaturated monocarboxylic acid ester monomer unit.

Another aspect of the present invention provides a rubber composition obtained by blending a cross-linking agent with the above carboxyl group-containing nitrile rubber.

Still another aspect of the present invention provides a cross-linked rubber obtained by cross-linking the above rubber composition.

Effects of Invention

According to the present invention, there can be provided a carboxyl group-containing nitrile rubber that has good productivity and excellent formability (in particular, mold contamination resistance) and that can give a cross-linked rubber excellent in the water resistance (in particular, LLC solution resistance) and the compression set resistance.

DESCRIPTION OF EMBODIMENTS

Carboxyl Group-Containing Nitrile Rubber

Figure 1:
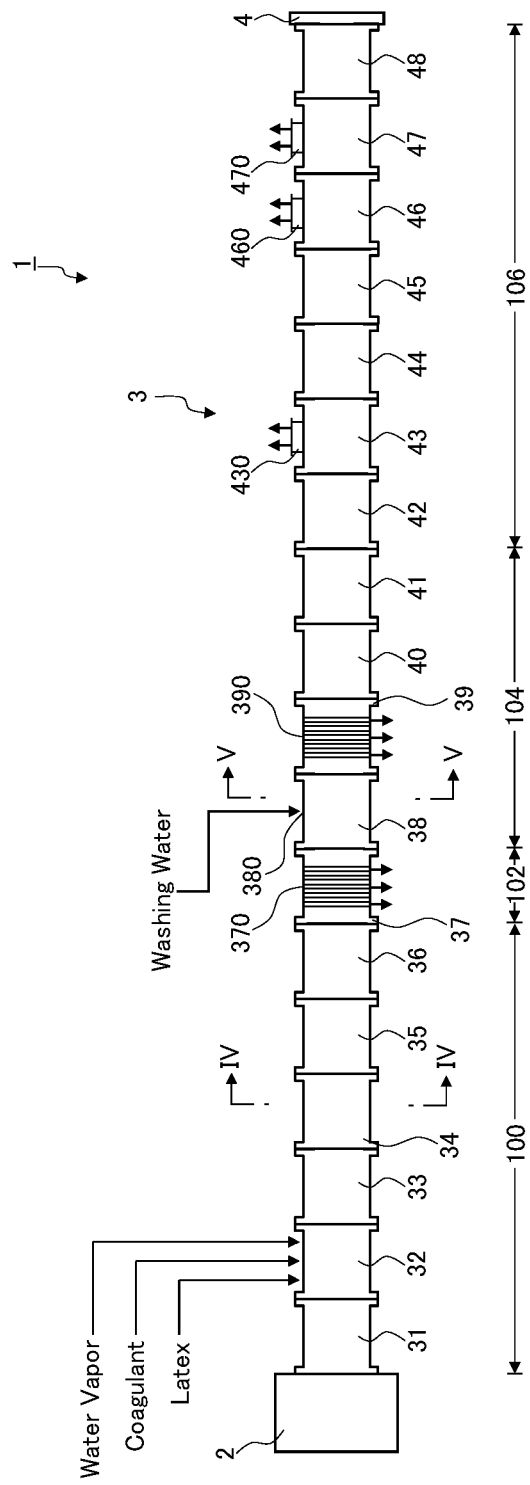
FIG. 1 is a schematic view illustrating an extruder used in a method recovering the carboxyl group-containing nitrile rubber according to an embodiment of the present invention.

The present invention provides a carboxyl group-containing nitrile rubber having an iodine value of 120 or less, wherein the content of sodium is 1500 ppm by weight or less, the total content of calcium, magnesium, and aluminum is 350 ppm by weight or less, and the storage elastic modulus at 140° C. is 350 kPa or more.

The carboxyl group-containing nitrile rubber according to the present invention is obtained, for example, through copolymerizing an α,β-ethylenically unsaturated nitrile monomer, a carboxyl group-containing monomer, and one or more other monomers that are copolymerizable with the above monomers and used as necessary, such as by an emulsion polymerization method, hydrogenating carbon-carbon double bonds in a copolymer obtained by the copolymerization for latex of the copolymer, and then coagulating and drying the latex of carboxyl group-containing nitrile rubber obtained by the hydrogenation.

The α,β-ethylenically unsaturated nitrile monomer is not limited so long as it is an α,β-ethylenically unsaturated compound having a nitrile group. Examples of the α,β-ethylenically unsaturated nitrile monomer include acrylonitrile; α-halogenoacrylonitriles such as α-chloroacrylonitrile and α-bromoacrylonitrile; α-alkylacrylonitriles such as methacrylonitrile; and the like, among which acrylonitrile and methacrylonitrile are preferred. One type of the α,β-ethylenically unsaturated nitrile monomer may be used alone, or two or more types may also be used in combination.

In the carboxyl group-containing nitrile rubber according to the present invention, the content ratio of the α,β-ethylenically unsaturated nitrile monomer unit is preferably from 5 to 60 wt %, more preferably from 10 to 40 wt %, and further preferably from 15 to 25 wt %. When the content ratio of the α,β-ethylenically unsaturated nitrile monomer unit falls within the above range, the oil resistance and the cold resistance can be well balanced in the obtained cross-linked rubber.

The carboxyl group-containing monomer is not particularly limited so long as it is a monomer copolymerizable with an α,β-ethylenically unsaturated nitrile monomer and having one or more unsubstituted (free) carboxyl groups that are not subjected to esterification or the like.

Examples of the carboxyl group-containing monomers include α,β-ethylenically unsaturated monocarboxylic acid monomers, α,β-ethylenically unsaturated polyvalent carboxylic acid monomers, α,β-ethylenically unsaturated dicarboxylic acid monoester monomers, and the like. The carboxyl group-containing monomers also include those having carboxyl groups that form carboxylates. In addition, anhydrides of the α,β-ethylenically unsaturated polyvalent carboxylic acids can be used as the carboxyl group-containing monomers because their acid anhydride groups are cleaved to form carboxyl groups after copolymerization.

Examples of the α,β-ethylenically unsaturated monocarboxylic acid monomers include acrylic acid, methacrylic acid, ethylacrylic acid, crotonic acid, cinnamic acid, and the like.

Examples of the α,β-ethylenically unsaturated polyvalent carboxylic acid monomers include butenedioic acids such as fumaric acid and maleic acid, itaconic acid, citraconic acid, mesaconic acid, glutaconic acid, allylmalonic acid, teraconic acid, and the like. Examples of the anhydrides of the α,β-ethylenically unsaturated polyvalent carboxylic acids include maleic anhydride, itaconic anhydride, citraconic anhydride, and the like.

Examples of the α,β-ethylenically unsaturated dicarboxylic acid monoester monomers include maleic acid monoalkyl esters such as monomethyl maleate, monoethyl maleate, monopropyl maleate, and mono-n-butyl maleate; maleic acid monocycloalkyl esters such as monocyclopentyl maleate, monocyclohexyl maleate, and monocycloheptyl maleate; maleic acid monoalkyl cycloalkyl esters such as monomethyl cyclopentyl maleate and monoethyl cyclohexyl maleate; fumaric acid monoalkyl esters such as monomethyl fumarate, monoethyl fumarate, monopropyl fumarate, and mono-n-butyl fumarate; fumaric acid monocycloalkyl esters such as monocyclopentyl fumarate, monocyclohexyl fumarate, and monocycloheptyl fumarate; fumaric acid monoalkyl cycloalkyl esters such as monomethyl cyclopentyl fumarate and monoethyl cyclohexyl fumarate; citraconic acid monoalkyl esters such as monomethyl citraconate, monoethyl citraconate, monopropyl citraconate, and mono-n-butyl citraconate; citraconic acid monocycloalkyl esters such as monocyclopentyl citraconate, monocyclohexyl citraconate, and monocycloheptyl citraconate; citraconic acid monoalkyl cycloalkyl esters such as monomethyl cyclopentyl citraconate and monoethyl cyclohexyl citraconate; itaconic acid monoalkyl esters such as monomethyl itaconate, monoethyl itaconate, monopropyl itaconate, and mono-n-butyl itaconate; itaconic acid monocycloalkyl esters such as monocyclopentyl itaconate, monocyclohexyl itaconate, and monocycloheptyl itaconate; itaconic acid monoalkyl cycloalkyl esters such as monomethyl cyclopentyl itaconate, and monoethyl cyclohexyl itaconate; and the like.

One type of the carboxyl group-containing monomer may be used alone, or two or more types may also be used in combination. Among these, the α,β-ethylenically unsaturated dicarboxylic acid monoester monomers are preferred, the α,β-ethylenically unsaturated dicarboxylic acid monoalkyl ester monomers are more preferred, maleic acid monoalkyl ester is further preferred, and mono-n-butyl maleate is particularly preferred. Note that the above alkyl esters preferably have 2 to 8 carbon atoms.

In the carboxyl group-containing nitrile rubber according to the present invention, the content of the carboxyl group-containing monomer unit is preferably from 0.1 to 20 wt %, more preferably from 0.5 to 15 wt %, and further preferably from 1 to 10 wt %. When the content of the carboxyl group-containing monomer unit falls within the above range, the mechanical properties and the compression set resistance of the obtained cross-linked rubber can be further improved.

From the viewpoint of further enhancing the rubber elasticity, the carboxyl group-containing nitrile rubber according to the present invention is preferably a copolymer obtained by copolymerizing a conjugated diene monomer in addition to the α,β-ethylenically unsaturated nitrile monomer and the carboxyl group-containing monomer.

As the conjugated diene monomer, conjugated diene monomers having 4 to 6 carbon atoms, such as 1,3-butadiene, isoprene, 2,3-dimethyl-1,3-butadiene, 1,3-pentadiene, and chloroprene, are preferred, 1,3-butadiene and isoprene are more preferred, and 1,3-butadiuene is particularly preferred. Among these, 1,3-butadiuene is preferred. These may each be used alone, or two or more types may also be used in combination.

In the carboxyl group-containing nitrile rubber according to the present invention, the content ratio of the conjugated diene monomer units (including saturated units thereof) is preferably from 20 to 68 wt %, more preferably from 35 to 64 wt %, and further preferably from 36 to 63 wt %. When the content ratio of the conjugated diene monomer units falls within the above range, the rubber elasticity of the obtained cross-linked rubber can be appropriately enhanced while improving the oil resistance, heat aging resistance, and chemical resistance stability.

From the viewpoint of further enhancing the cold resistance, the carboxyl group-containing nitrile rubber according to the present invention is preferably a copolymer obtained by copolymerizing an $\alpha,\beta$-ethylenically unsaturated monocarboxylic acid ester monomer in addition to the $\alpha,\beta$-ethylenically unsaturated nitrile monomer, the conjugated diene monomer, and the carboxyl group-containing monomer.

The $\alpha,\beta$-ethylenically unsaturated monocarboxylic acid ester monomer is not particularly limited. Examples of the $\alpha,\beta$-ethylenically unsaturated monocarboxylic acid ester monomer include $\alpha,\beta$-ethylenically unsaturated monocarboxylic acid alkyl ester monomers, $\alpha,\beta$-ethylenically unsaturated monocarboxylic acid alkoxyalkyl ester monomers, $\alpha,\beta$-ethylenically unsaturated monocarboxylic acid aminoalkyl ester monomers, $\alpha,\beta$-ethylenically unsaturated monocarboxylic acid hydroxyalkyl ester monomers, $\alpha,\beta$-ethylenically unsaturated monocarboxylic acid fluoroalkyl ester monomers, and the like. Among these, $\alpha,\beta$-ethylenically unsaturated monocarboxylic acid alkyl ester monomers or $\alpha,\beta$-ethylenically unsaturated monocarboxylic acid alkoxyalkyl ester monomers are preferred.

The $\alpha,\beta$-ethylenically unsaturated monocarboxylic acid alkyl ester monomer preferably has an alkyl group having 3 to 10 carbon atoms, more preferably has an alkyl group having 3 to 8 carbon atoms, and further preferably has an alkyl group having 4 to 6 carbon atoms, as the alkyl group.

Specific examples of the $\alpha,\beta$-ethylenically unsaturated monocarboxylic acid alkyl ester monomer include acrylic acid alkyl ester monomers such as methyl acrylate, ethyl acrylate, propyl acrylate, isobutyl acrylate, n-butyl acrylate, n-pentyl acrylate, 2-ethylhexyl acrylate, and n-dodecyl acrylate; acrylic acid cycloalkyl ester monomers such as cyclopentyl acrylate and cyclohexyl acrylate; acrylic acid alkylcycloalkyl ester monomers such as methylcyclopentyl acrylate, ethylcyclopentyl acrylate, and methylcyclohexyl acrylate; methacrylic acid alkyl ester monomers such as methyl methacrylate, ethyl methacrylate, propyl methacrylate, n-butyl methacrylate, n-pentyl methacrylate, and n-octyl methacrylate; methacrylic acid cycloalkyl ester monomers such as cyclopentyl methacrylate, cyclohexyl methacrylate, and cyclopentyl methacrylate; methacrylic acid alkylcycloalkyl ester monomers such as methylcyclopentyl methacrylate, ethylcyclopentyl methacrylate, and methylcyclohexyl methacrylate; crotonic acid alkyl ester monomers such as propyl crotonate, n-butyl crotonate, and 2-ethylhexyl crotonate; crotonic acid cycloalkyl ester monomers such as cyclopentyl crotonate, cyclohexyl crotonate, and cyclooctyl crotonate; crotonic acid alkylcycloalkyl ester monomers such as methylcyclopentyl crotonate and methylcyclohexyl crotonate; and the like.

The $\alpha,\beta$-ethylenically unsaturated monocarboxylic acid alkoxyalkyl ester monomer preferably has an alkoxyalkyl group having 2 to 8 carbon atoms, more preferably has an alkoxyalkyl group having 2 to 6 carbon atoms, and further preferably has an alkoxyalkyl group having 2 to 4 carbon atoms, as the alkoxy alkyl group.

Specific examples of the $\alpha,\beta$-ethylenically unsaturated monocarboxylic acid alkoxyalkyl ester monomer include acrylic acid alkoxyalkyl ester monomers such as methoxymethyl acrylate, methoxyethyl acrylate, methoxybutyl acrylate, ethoxymethyl acrylate, ethoxyethyl acrylate, ethoxypropyl acrylate, ethoxydodecyl acrylate, n-propoxyethyl acrylate, i-propoxyethyl acrylate, n-butoxyethyl acrylate, i-butoxyethyl acrylate, t-butoxyethyl acrylate, methoxypropyl acrylate, and methoxybutyl acrylate; methacrylic acid alkoxyalkyl ester monomers such as methoxymethyl methacrylate, methoxyethyl methacrylate, methoxybutyl methacrylate, ethoxymethyl methacrylate, ethoxyethyl methacrylate, ethoxypentyl methacrylate, n-propoxyethyl methacrylate, i-propoxyethyl methacrylate, n-butoxyethyl methacrylate, i-butoxyethyl methacrylate, t-butoxyethyl methacrylate, methoxypropyl methacrylate, and methoxybutyl methacrylate; and the like.

Among these $\alpha,\beta$-ethylenically unsaturated monocarboxylic acid ester monomers, the acrylic acid alkyl ester monomer and the acrylic acid alkoxyalkyl ester monomer are preferred, and the n-butyl acrylate and the methoxyethyl acrylate are more preferred. Two or more types of these $\alpha,\beta$-ethylenically unsaturated monocarboxylic acid ester monomers can also be used in combination.

One type of the $\alpha,\beta$-ethylenically unsaturated monocarboxylic acid ester monomer may be used alone, or two or more types may also be used in combination. In the carboxyl group-containing nitrile rubber according to the present invention, the content of the $\alpha,\beta$-ethylenically unsaturated monocarboxylic acid ester monomer unit is preferably from 10 to 60 wt %, more preferably from 15 to 55 wt %, and further preferably from 20 to 50 wt %. When the content of the $\alpha,\beta$-ethylenically unsaturated monocarboxylic acid ester monomer unit falls within the above range, the cold resistance of the obtained cross-linked rubber can be further appropriately enhanced.

The carboxyl group-containing nitrile rubber according to the present invention may be a copolymer obtained by copolymerizing, in addition to the $\alpha,\beta$-ethylenically unsaturated nitrile monomer, the conjugated diene monomer, the carboxyl group-containing monomer, and the $\alpha,\beta$-ethylenically unsaturated monocarboxylic acid ester monomer, one or more other monomers that are copolymerizable with the above monomers. Examples of such other monomers include an $\alpha,\beta$-ethylenically unsaturated monocarboxylic acid ester monomer (excluding those described above), ethylene, an $\alpha$-olefin monomer, an aromatic vinyl monomer, a fluorine-containing vinyl monomer, a copolymerizable antiaging agent, and the like.

Examples of such an $\alpha,\beta$-ethylenically unsaturated monocarboxylic acid ester monomer include (meth)acrylic acid esters each having a cyanoalkyl group having 2 to 12 carbon atoms, such as $\alpha$-cyanoethyl acrylate, $\alpha$-cyanoethyl methacrylate, and cyanobutyl methacrylate; (meth)acrylic acid esters each having a hydroxyalkyl group having 1 to 12 carbon atoms, such as 2-hydroxyethyl acrylate, 2-hydroxypropyl acrylate, and 2-hydroxyethyl methacrylate; (meth)acrylic acid esters each having a fluoroalkyl group having 1 to 12 carbon atoms, such as trifluoroethyl acrylate and tetrafluoropropyl methacrylate; and the like.

The α-olefin monomer preferably has 3 to 12 carbon atoms, and examples of such an α-olefin monomer include propylene, 1-butene, 4-methyl-1-pentene, 1-hexene, 1-octene, and the like.

Examples of the aromatic vinyl monomer include styrene, α-methylstyrene, vinylpyridine, and the like.

Examples of the fluorine-containing vinyl monomer include fluoroethyl vinyl ether, fluoropropyl vinyl ether, o-trifluoromethylstyrene, vinyl pentafluorobenzoate, difluoroethylene, tetrafluoroethylene, and the like.

Examples of the copolymerizable antiaging agent include N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy) aniline, N-phenyl-4-(4-vinylbenzyloxy)aniline, and the like.

These copolymerizable other monomers may each be used alone, or two or more types may also be used in combination. The content of the other monomer units in the carboxyl group-containing nitrile rubber according to the present invention is preferably 30 wt % or less, more preferably 15 wt % or less, and further preferably 5 wt % or less.

The iodine value of the carboxyl group-containing nitrile rubber according to the present invention is 120 or less, preferably 60 or less, more preferably 35 or less, and particularly preferably 15 or less. If the iodine value is unduly high, the heat resistance and ozone resistance of the obtained cross-linked rubber may deteriorate.

In the carboxyl group-containing nitrile rubber according to the present invention, the content of sodium is 1500 ppm by weight or less, the total content of calcium, magnesium, and aluminum is 350 ppm by weight or less, and the storage elastic modulus at 140° C. is within a range of 350 kPa or more.

In the present invention, when the content of sodium and the total content of calcium, magnesium, and aluminum in the carboxyl group-containing nitrile rubber fall within the above respective ranges and the storage elastic modulus at 140° C. falls within the above range, the carboxyl group-containing nitrile rubber has good productivity and excellent formability (in particular, mold contamination resistance) and can give a cross-linked rubber excellent in the water resistance (in particular, LLC solution resistance) and the compression set resistance.

The content of sodium in the carboxyl group-containing nitrile rubber according to the present invention is 1500 ppm by weight or less, preferably 1200 ppm by weight or less, further preferably 1000 ppm by weight or less, still further preferably 860 ppm by weight or less, and particularly preferably 850 ppm by weight or less. The lower limit of the content of sodium is not particularly limited, but is preferably 10 ppm by weight or more, more preferably 50 ppm by weight or more, and further preferably 100 ppm by weight or more. The total content of calcium, magnesium, and aluminum in the carboxyl group-containing nitrile rubber according to the present invention is 350 ppm by weight or less, preferably 300 ppm by weight or less, further preferably 100 ppm by weight or less, still further preferably 80 ppm by weight or less, and particularly preferably 70 ppm by weight or less. The lower limit of the total content of calcium, magnesium, and aluminum is not particularly limited, but is preferably 1.5 ppm by weight or more, more preferably 3.0 ppm by weight or more, and further preferably 4.5 ppm by weight or more. If either or both of the content of sodium and the total content of calcium, magnesium, and aluminum are unduly large, the formability of the carboxyl group-containing nitrile rubber will deteriorate, and the obtained cross-linked rubber will be inferior in the water resistance (in particular, LLC solution resistance). Methods of setting the content of sodium and the total content of calcium, magnesium, and aluminum within the above respective ranges are not particularly limited, but examples of such methods include a method in which, when the carboxyl group-containing nitrile rubber is recovered from the latex of carboxyl group-containing nitrile rubber, a monovalent or divalent metal salt is used as the coagulant and the method recovering the carboxyl group-containing nitrile rubber according to the present embodiment, which will be described later, is adopted, a method in which the number of washings is increased after tank coagulation or pump coagulation, a method in which the amount of coagulant is reduced, a method in which washing is performed with water that contains a metal adsorbent, a method in which the rubber shape is made fine at the time of washing, and the like.

In the carboxyl group-containing nitrile rubber according to the present invention, the storage elastic modulus at 140° C. is 350 kPa or more, preferably 352 kPa or more, and more preferably 353 kPa or more. The upper limit of the storage elastic modulus at 140° C. is not particularly limited, but is preferably 5000 kPa or less. If the storage elastic modulus is unduly low, the formability of the carboxyl group-containing nitrile rubber will deteriorate. The method of setting the storage elastic modulus within the above range is not particularly limited, but examples of such a method include a method of adjusting the coagulation temperature when recovering the carboxyl group-containing nitrile rubber from the latex of carboxyl group-containing nitrile rubber, a method of adjusting the type and amount of a coagulant used for coagulation, a method of adjusting the monomer composition of the carboxyl group-containing nitrile rubber, a method of adjusting the weight-average molecular weight of the carboxyl group-containing nitrile rubber, a method of controlling the addition timing of a chain transfer agent when polymerizing the carboxyl group-containing nitrile rubber, a method of controlling the polymerization temperature when polymerizing the carboxyl group-containing nitrile rubber, a method of adopting the method recovering the carboxyl group-containing nitrile rubber according to the present embodiment, which will be described later, and the like. These methods may be combined. The storage elastic modulus at 140° C. can be measured using a dynamic viscoelasticity measuring apparatus under the conditions of a dynamic shear strain of 6.98%, a frequency of 91 Hz (shear velocity of 40 $s^{-1}$), and a temperature of 140° C.

In the carboxyl group-containing nitrile rubber according to the present invention, the methyl ethyl ketone insoluble content is preferably 40 wt % or less, more preferably 35 wt % or less, and further preferably 30 wt % or less because the formability can be improved and the water resistance (in particular, LLC solution resistance) and compression set resistance of the obtained cross-linked rubber can also be improved.

The Mooney viscosity [ML1+4 (100° C.)] of the carboxyl group-containing nitrile rubber according to the present invention is preferably from 5 to 200, more preferably from 10 to 100, and further preferably from 30 to 80. The Mooney viscosity of the nitrile rubber can be adjusted by appropriately selecting conditions such as the amount of a chain transfer agent, the polymerization reaction temperature, and the concentration of a polymerization initiator.

The method of producing the carboxyl group-containing nitrile rubber according to the present invention is not particularly limited, but the carboxyl group-containing nitrile rubber can be obtained through copolymerizing the above-described monomers by an emulsion polymerization method, hydrogenating carbon-carbon double bonds in a copolymer obtained by the copolymerization for latex of the copolymer, and then coagulating and drying the latex of carboxyl group-containing nitrile rubber obtained by the hydrogenation. During the emulsion polymerization, in addition to an emulsifier, a polymerization initiator, and a molecular weight modifier, commonly-used polymerization sub-materials can be used.

When performing the hydrogenation for the latex of copolymer obtained by the copolymerization, the type and amount of a hydrogenation catalyst used for the hydrogenation reaction, the hydrogenation temperature, and the like may be determined in accordance with a known method.

When a hydrogenation catalyst or the like that contains a platinum group element is used in the hydrogenation reaction, an operation of removing the hydrogenation catalyst may be performed. The removal of the hydrogenation catalyst is performed, for example, by the following method. First, an insoluble complex is famed and precipitated using a complexing agent to complex the platinum group element in a platinum group element compound that is present in the aqueous medium or the polymer particles of the latex of carboxyl group-containing nitrile rubber after the hydrogenation reaction. Then, the latex containing the insoluble complex thus obtained is continuously supplied to a centrifugal separator to continuously perform a centrifugal separation operation, and the platinum group element can thereby be continuously removed in a state of the insoluble complex from the latex of carboxyl group-containing nitrile rubber. In this operation, another separation method may be adopted as substitute for the centrifugal separation operation.

Method of Recovering Carboxyl Group-Containing Nitrile Rubber According to Present Embodiment The method of recovering the carboxyl group-containing nitrile rubber from the latex of carboxyl group-containing nitrile rubber obtained as above will then be described.

FIG. 1 is a schematic view illustrating an extruder 1 used in the method of recovering the carboxyl group-containing nitrile rubber according to the present embodiment of the present invention.

The following description will be made for an exemplary case in which the method of recovering the carboxyl group-containing nitrile rubber is performed using the extruder 1 illustrated in FIG. 1 as a carboxyl group-containing nitrile rubber recovery apparatus used in the present invention. This method includes obtaining the water-containing crumbs comprising the crumb-like carboxyl group-containing nitrile rubber from the latex of carboxyl group-containing nitrile rubber obtained in accordance with the above method and then recovering the carboxyl group-containing nitrile rubber from the water-containing crumbs.

As illustrated in FIG. 1, the extruder 1 as a carboxyl group-containing nitrile rubber recovery apparatus according to the present embodiment has a drive unit 2 and a single barrel 3 that is composed of 18 divided barrel blocks 31 to 48. In the barrel 3, a coagulation zone 100, a drainage zone 102, a washing/dewatering zone 104, and a drying zone 106 are famed in this order from the upstream side to the downstream side of the barrel 3.

The coagulation zone 100 is a region in which the latex of carboxyl group-containing nitrile rubber and a coagulant are brought into contact with each other to coagulate the polymer to form a slurry liquid of crumb-like carboxyl group-containing nitrile rubber (crumb slurry). The drainage zone 102 is a region in which a liquid (serum water) caused after the coagulation of the carboxyl group-containing nitrile rubber is separated from the crumb slurry and discharged to form crumbs in a water-containing state. The washing/dewatering zone 104 is a region in which the crumbs in the water-containing state are washed and the washing water is removed from the washed crumbs and discharged. The drying zone 106 is a region in which the dewatered crumbs are dried.

In the present embodiment, the inside of the barrel blocks 31 to 36 corresponds to the coagulation zone 100, the inside of the barrel block 37 corresponds to the drainage zone 102, the inside of the barrel blocks 38 to 41 corresponds to the washing/dewatering zone 104, and the inside of the barrel blocks 42 to 48 corresponds to the drying zone 106. The number of barrel blocks to be installed can be optimized for implementation in accordance with the composition of the carboxyl group-containing nitrile rubber to be handled, etc., and is not limited to that illustrated in FIG. 1.

The barrel block 32 which constitutes a part of the coagulation zone 100 is formed with a feed port 320 (not illustrated) for supplying the latex of carboxyl group-containing nitrile rubber, a feed port 321 (not illustrated) for supplying a coagulant, and a feed port 322 (not illustrated) for supplying water vapor. The barrel block 37 which constitutes the drainage zone 102 is famed with drainage slits 370 that discharge the serum water separated from the water slurry of the coagulated carboxyl group-containing nitrile rubber. The barrel block 38 which constitutes a part of the washing/dewatering zone 104 is formed with a first washing water feed port 380 that receives the washing water, and the barrel block 39 is famed with drainage slits that discharge the washing drainage to the outside. The barrel blocks 43, 46, and 47 which constitute a part of the drying zone 106 are famed with vent ports 430, 460, and 470 for degassing, respectively.

Figure 2:
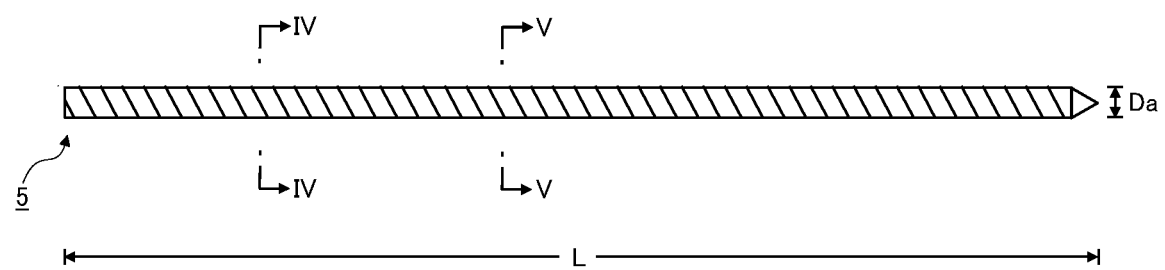
FIG. 2 is a schematic view illustrating a screw disposed inside the extruder.

FIG. 2 is a schematic view illustrating a screw disposed inside the extruder 1. A screw 5 as illustrated in FIG. 2 is disposed inside the barrel 3. To drive the screw 5, a drive means such as a motor housed in the drive unit 2 (see FIG. 1) is connected to the base end of the screw 5, and the screw 5 is thereby held so as to be capable of being rotationally driven. The shape of the screw 5 is not particularly limited, but the screw 5 can be configured, for example, such that screw blocks and kneading disks having various screw configurations are appropriately combined.

Figure 3:
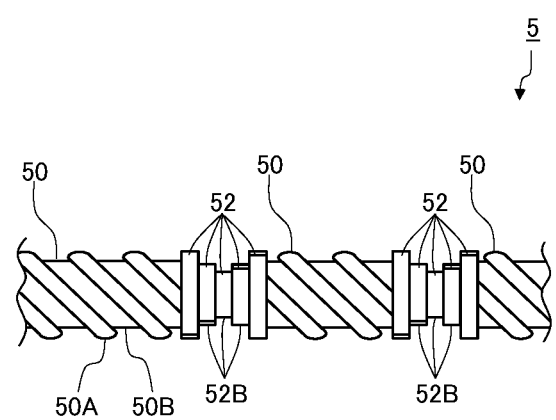
FIG. 3 is a partially broken schematic view of the screw of FIG. 2.

In the present embodiment, the screw 5 has a screw configuration of a different form in the region corresponding to each of the above-described zones 100, 102, 104, and 106 famed inside the barrel 3. Here, FIG. 3 is a partially broken schematic view of the screw of FIG. 2. As illustrated in FIG. 3, the screw 5 is composed of screw blocks 50 and kneading disks 52. FIG. 3 is a diagram illustrating an example of a combination of the screw blocks 50 and the kneading disks 52, and the present embodiment is not particularly limited to the combination illustrated in FIG. 3.

As illustrated in FIG. 2, in the present embodiment, when the length of the screw 5 is L (mm) and the outer diameter of the screw 5 is Da (mm), L/Da is preferably from 30 to 100 and more preferably from 40 to 80. The outer diameter Da of the screws 5 is defined as the diameter of crest portions 50A (see FIG. 3) of the screw blocks 50, which constitute the screw, when viewed from the axial direction.

Figure 4:
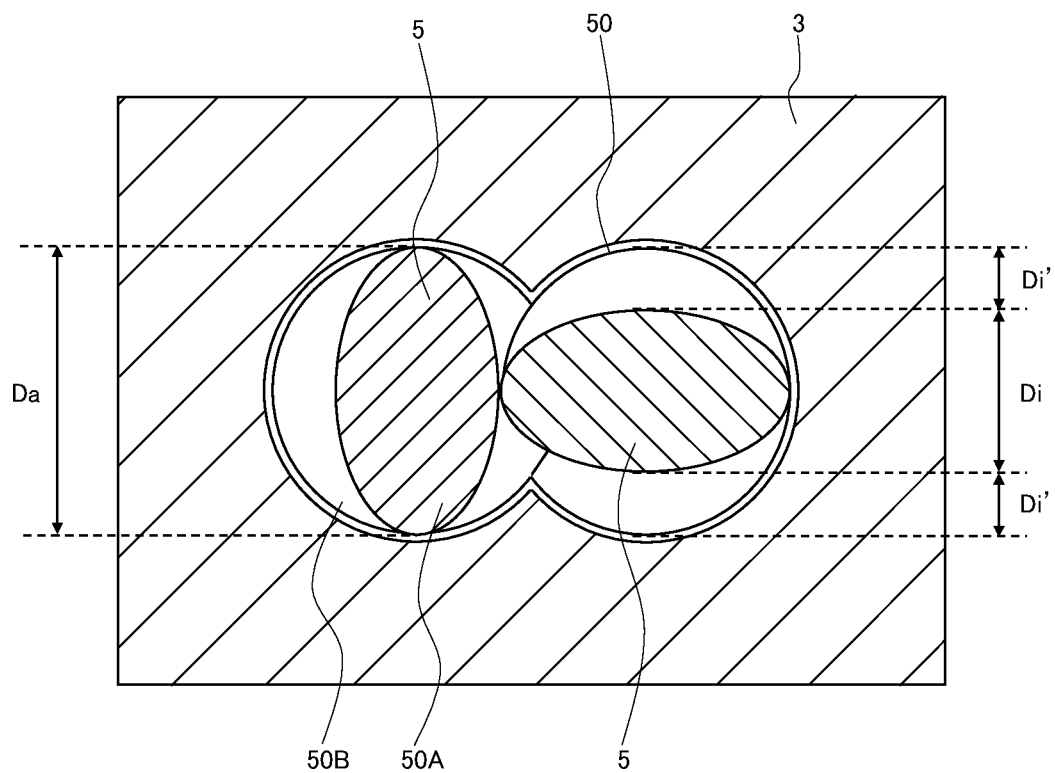
FIG. 4 is a cross-sectional view taken along IV-IV line of FIG. 1 and IV-IV line of FIG. 2.

As illustrated in FIG. 4, in the present embodiment, two such screws 5 are used to provide a twin-screw extruder in which the shaft cores are meshed with each other in parallel. Here, FIG. 4 is a cross-sectional view taken along IV-IV line of FIG. 1 and IV-IV line of FIG. 2, and the cross-sectional view illustrated in FIG. 4 is a cross-sectional view of a screw block 50 portion of the extruder 1. This cross-sectional view crosses root portions 50B. That is, as illustrated in FIG. 4, the two screws 5 and 5 are of a biaxial meshing type in which the crest portion 50A of a screw block 50 for coagulation of one screw 5 is meshed with the root portion 50B of a screw block 50 for coagulation of the other screw 5 while the root portion 50B of the screw block 50 for coagulation of the one screw 5 is meshed with the crest portion 50A of the screw block 50 for coagulation of the other screw 5. The biaxial meshing type can improve the mixing property in each of the zones 100, 102, 104, and 106. The rotation directions of the two screws 5 may be the same direction or different directions, but from the viewpoint of self-cleaning performance, the type of rotation in the same direction is preferred.

As illustrated in FIG. 4, in the present embodiment, when the outer diameter of the screw block 50 is Da (mm) and the shorter diameter of the root portion 50B of the screw block 50 is Di (mm), Da/Di is preferably in a range from 1.2 to 2.5, more preferably a range from 1.4 to 2.0, and further preferably a range from 1.5 to 1.8. By setting Da/Di in such a range, the recovery rate and the production rate (amount of dried carboxyl group-containing nitrile rubber obtained per unit time) can be improved without making the facilities large-scale.

As illustrated in FIG. 4, the shorter diameter Di of the root portion 50B is the diameter of a portion of the root portion 50B in which the depth of the root portion 50B is a deepest depth Dl' (mm) when viewed from the axial direction. That is, the shorter diameter Di of the root portion 50B can be obtained as Di=Da−Di'×2 from the outer diameter Da and the deepest depth Di' of the root portion 50B.

Figure 5:
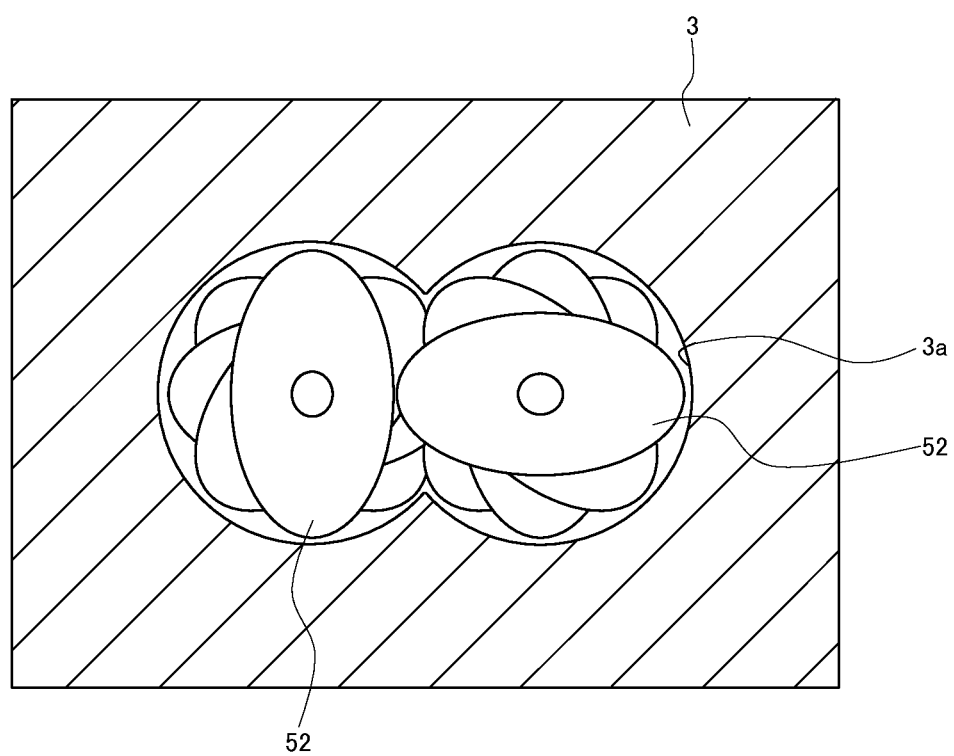
FIG. 5 is a cross-sectional view taken along V-V line of FIG. 1 and V-V line of FIG. 2.

The kneading disks 52 have a cross-sectional shape such as a pseudo-elliptical shape, an oval shape, or a truncated triangle shape and a constant thickness and are used in a state in which the plural kneading disks 52 are stacked while shifting the axis of symmetry of the cross-sectional shape by a predetermined angle and are fixed so that the screw axis corresponds to the rotation center axis of the cross-sectional shape. Here, FIG. 5 is a cross-sectional view taken along line V-V of FIG. 1 and line V-V of FIG. 2, and the cross-sectional view illustrated in FIG. 5 is a cross-sectional view of a kneading disk 52 portion of the extruder 1. FIGS. 3 and 5 illustrate a form in which the kneading disks 52 have a pseudo-elliptical cross-sectional shape and five disks are stacked and shifted by 45 degrees. In the present embodiment, however, the kneading disks 52 are not particularly limited to such a form, and the plural kneading disks 52 can be combined at a predetermined shift angle thereby to achieve forward feed kneading disks, neutral kneading disks, or backward feed kneading disks. The forward feed kneading disks refer to a plurality of kneading disks 52 that are shifted in phase in the forward feed direction (e.g., shifted by 45° or 60°) to have a feeding capability in the forward feed direction, and the backward feed kneading disks refer to a plurality of kneading disks 52 that are shifted in phase in the backward feed direction (e.g., shifted by 270°) to have a feeding capability in the backward feed direction. The neutral kneading disks refer to a plurality of kneading disks 52 that are shifted by 90° and formed in parallel in the axial direction so as not to have a feeding capacity.

In FIGS. 3 and 5, the kneading disks 52 have a pseudo-elliptical cross-sectional shape. The pseudo-elliptical shape refers to a shape obtained by cutting both end portions of the longer diameter of the ellipse at arcs centered on the rotation center of the figure. The oval shape refers to a shape obtained by cutting both end portions of the parallel strips at arcs centered on the rotation center of the figure. The truncated triangle shape refers to a shape obtained by cutting portions including respective vertices of a regular triangle at arcs centered on the rotation center of the figure. In any shape, the end portions of each disk are provided to maintain a clearance (gap) of about 0.1 to 5 mm on an inner wall surface 3a of the barrel 3. In the case of an oval shape or a truncated triangle, each side may be in a concave shape such as a drum shape or a triangular spool shape.

In the present embodiment, the screw configuration of the screw 5 in a portion corresponding to the first washing water feed port 380 is preferably composed of a plurality of kneading disks 52. This screw configuration is famed in the barrel block 38 which constitutes a part of the washing/dewatering zone 104. Thus, the portion of the screw 5 corresponding to the first washing water feed port 380 is composed of a plurality of kneading disks 52, and when the washing water is supplied from the first washing water feed port 380, as will be described later, the washing water can thereby be supplied in a state in which the water pressure is increased. This can enhance the washing effect, and in the recovered carboxyl group-containing nitrile rubber, the content of sodium and the total content of calcium, magnesium, and aluminum due to the coagulant or the like can be appropriately reduced.

In the present embodiment, a die 4 is connected to the downstream side of the above-described barrel block 48. The die 4 is for extruding the carboxyl group-containing nitrile rubber subjected to the coagulation/dewatering/drying processes in the barrel 3 into a predetermined shape and commercializing it. For example, the carboxyl group-containing nitrile rubber can be extruded into a sheet-like shape. The die 4 is usually provided with a metal mesh for trapping foreign substances and the like on the upstream side of the discharge port.

A method of recovering the carboxyl group-containing nitrile rubber using the extruder 1 according to the present embodiment will then be described.

First, the latex of carboxyl group-containing nitrile rubber, a coagulant, and water vapor are supplied to the coagulation zone 100, respectively, from the pipe connected to the feed port 320, from the pipe connected to the feed port 321, and from the pipe connected to the feed port 322. The coagulant is not particularly limited, but a salt of monovalent or divalent metal is preferably used from the viewpoint that the polymer Mooney viscosity and the polymer pH can be controlled within appropriate ranges thereby to ensure the processability or the like of the obtained carboxyl group-containing nitrile rubber and the viewpoint that the storage elastic modulus at 140° C. can be appropriately increased. Specific examples of the coagulant include calcium chloride, magnesium chloride, sodium chloride, magnesium sulfate, barium chloride, and the like. Among these, sodium chloride is preferably used from the viewpoint that the storage elastic modulus at 140° C. can be further appropriately increased.

The supply rates of the latex of carboxyl group-containing nitrile rubber, the coagulant, and the water vapor into the coagulation zone 100 vary depending on the size of the extruder 1 or the like and are not particularly limited.

The amount of the coagulant supplied from the feed port 321 is preferably from 0.5 to 200 parts by weight and more preferably from 1 to 95 parts by weight with respect to 100 parts by weight of the carboxyl group-containing nitrile rubber contained in the latex of carboxyl group-containing nitrile rubber. When the supply amount of the coagulant falls within the above range, the coagulation of the carboxyl group-containing nitrile rubber can be sufficiently progressed, the uncoagulated content can be reduced, and the yield can be improved. The coagulant may be dissolved in water or the like and supplied as a coagulating liquid from the feed port 321. In this case, the concentration of the coagulant in the coagulating liquid is not particularly limited, but is preferably about 1 to 35 wt % with respect to the entire coagulating liquid.

The latex of carboxyl group-containing nitrile rubber, the coagulant, and the water vapor supplied to the coagulation zone 100 are brought into contact with each other by the rotation of the screw 5, and the carboxyl group-containing nitrile rubber is coagulated and suspended in water as crumbs having a diameter of about 5 to 30 mm to form a slurry liquid (crumb slurry) having a crumb concentration of about 5 to 30 wt %. The temperature inside the coagulation zone 100 is preferably from 10° C. to 100° C. and more preferably from 45° C. to 90° C. When the temperature of the coagulation zone 100 falls within such a range, the coagulation of the carboxyl group-containing nitrile rubber can be sufficiently progressed with satisfactory coagulation of the carboxyl group-containing nitrile rubber, the uncoagulated content can be reduced, and the yield can be improved.

The crumb slurry obtained in the coagulation zone 100 is sent to the drainage zone 102 by the rotation of the screw 5. In the drainage zone 102, a high-concentration coagulant contained in the crumb slurry is discharged as serum water from the slits 370 provided in the barrel block 37, and crumbs in a water-containing state that contain about 40 to 70 wt % of water are obtained.

The crumbs in a water-containing state obtained in the drainage zone 102 are sent to the washing/dewatering zone 104 by the rotation of the screw 5. In the washing/dewatering zone 104, washing water is introduced into the inside from the washing water feed port 380 provided in the barrel block 38, and the washing water and the crumbs are mixed to wash the crumbs, which are then dewatered. The drainage after the washing is discharged from the slits 390 provided in the barrel block 39.

In the present embodiment, the screw configuration of the screw 5 in a portion corresponding to the first washing water feed port 380 which is provided in the barrel block 38 constituting the washing/dewatering zone 104 (i.e., the screw configuration of the screw 5 at the outlet of the first washing water feed port 380) is composed of a plurality of the kneading disks 52. When the screw configuration of the screw 5 in a portion corresponding to the first washing water feed port 380 is composed of a plurality of the kneading disks 52, the washing water supplied from the first washing water feed port 380 can be supplied in a state in which the water pressure is increased, and the washing efficiency can thereby be enhanced. This can appropriately reduce the content of sodium and the total content of calcium, magnesium, and aluminum due to the coagulant or the like in the recovered carboxyl group-containing nitrile rubber.

In particular, when the portion of the screw 5 corresponding to the first washing water feed port 380 is composed of a plurality of kneading disks 52, the presence of the plurality of kneading disks 52 and the presence of crumbs kneaded by the plurality of kneading disks 52 reduce the space volume of that portion, and the diffusion in the barrel block 38 of the washing water supplied from the first washing water feed port 380 is suppressed (or a flow path is less likely to be ensured), so that the water pressure of the supplied washing water can be increased. When the portion corresponding to the first washing water feed port 380 is composed of a plurality of kneading disks 52, the disk configuration is not particularly limited, but preferably includes the forward feed kneading disks, the neutral kneading disks, or the backward feed kneading disks, and these may be combined.

In the present embodiment, the portion of the screw 5 corresponding to the first washing water feed port 380 may be composed of a plurality of kneading disks 52, but the following forms are preferred from the viewpoint of appropriately increasing the water pressure of the supplied washing water thereby to be able to efficiently reduce the content of sodium and the total content of calcium, magnesium, and aluminum due to the coagulant or the like contained in the obtained carboxyl group-containing nitrile rubber. That is, the screw configuration of the screw 5 in the barrel block 38 formed with the first washing water feed port 380 is preferably configured such that the fraction occupied by the kneading disks 52 (fraction occupied in the longitudinal direction) is within a range from 30% to 100% and more preferably configured such that the fraction occupied by the kneading disks 52 is within a range from 60% to 100%. Such a configuration can further improve the washing efficiency for the crumbs in the washing/dewatering zone 104.

In the entire washing/dewatering zone 104, the fraction occupied by the kneading disks 52 in the screw 5 (fraction occupied in the longitudinal direction) is not particularly limited, but is preferably from 5% to 85% and more preferably from 10% to 80% from the viewpoint of increasing the dewatering efficiency in addition to the washing efficiency.

The supply rate of the washing water supplied from the washing water feed port 380 is not particularly limited, but is preferably from 30 to 300 L/hr and more preferably from 70 to 200 L/hr. Additionally or alternatively, the amount of washing water supplied from the first washing water feed port 380 is preferably from 25 to 1000 parts by weight and more preferably from 50 to 900 parts by weight with respect to 100 parts by weight of the carboxyl group-containing nitrile rubber. When the supply rate of the washing water and the amount of the washing water fall within the above respective ranges, the washing effect in the washing/dewatering zone 104 can be further enhanced, and the content of sodium and the total content of calcium, magnesium, and aluminum due to the coagulant or the like in the recovered carboxyl group-containing nitrile rubber can thereby be further effectively reduced. The temperature of the washing water is not particularly limited, but is preferably from 10° C. to 90° C. and more preferably from 40° C. to 80° C.

In the region before the first washing water feed port 380 in the washing/dewatering zone 104, the barrel block temperature is preferably from 40° C. to 100° C. and more preferably from 50° C. to 90° C. Additionally or alternatively, in the region after the first washing water feed port 380, the barrel block temperature is preferably from 80° C. to 200° C. and more preferably from 90° C. to 180° C. In the washing/dewatering zone 104, washed crumbs containing about 2 to 20 wt % of water can be obtained.

Subsequently, the crumbs obtained in the washing/dewatering zone 104 are sent to the drying zone 106 by the rotation of the screw 5. The crumbs sent to the drying zone 106 are plasticized and kneaded by the rotation of the screw 5 to become a melt, which generates heat and is carried to the downstream side while raising the temperature. Then, when the melt reaches the vent ports 430, 460, and 470 provided in the barrel blocks 43, 46, and 47, the pressure is released, and the water contained in the melt is therefore separated and vaporized. This separated and vaporized water (vapor) is discharged to the outside through vent pipes (not illustrated). The temperature inside the drying zone 106 is preferably from 90° C. to 200° C. and more preferably from 100° C. to 180° C. The internal pressure (pressure at the die portion) is about 1000 to 13000 kPa (G: gauge pressure). The drying zone 106 may be depressurized.

The crumbs from which the water has been separated through the drying zone 106 are sent out to the outlet side by the screw 5 and introduced into the die 4 in a state of substantially containing almost no water (water content is 1.0 wt % or less), and the crumbs are discharged in a sheet-like shape from the die 4 and introduced into a sheet cutter (not illustrated) to be cut into an appropriate length.

Thus, the carboxyl group-containing nitrile rubber can be recovered from the latex of carboxyl group-containing nitrile rubber.

The above-described embodiment has been exemplified as a form in which the barrel block 38 constituting the washing/dewatering zone 104 is provided with the first washing water feed port 380 and the washing water is supplied from the first washing water feed port 380, but the embodiment of the present invention is not particularly limited to such a form, and in another form, the barrel block 40 may be provided with a second washing water feed port 400 as substitute for the first washing water feed port 380 and the washing water is supplied from the second washing water feed port 400. In still another form, from the viewpoint of further enhancing the washing effect in the washing/dewatering zone 104, the washing water may be supplied from the second washing water feed port 400 in addition to the first washing water feed port 380. The supply condition when supplying the washing water from the second washing water feed port 400 may be the same as that when supplying the washing water from the first washing water feed port 380.

When the barrel block 40 is provided with the second washing water feed port 400, the screw configuration of the screw 5 in a portion corresponding to the second washing water feed port 400 provided in the barrel block 40 (i.e., the screw configuration of the screw 5 at the outlet of the second washing water feed port 400) is preferably composed of a plurality of the kneading disks 52 from the viewpoint of increasing the water pressure of the washing water supplied from the second washing water feed port 400 thereby to enhance the washing effect. Additionally or alternatively, from the viewpoint of further appropriately increasing the water pressure of the washing water supplied from the second washing water feed port 400 thereby to be able to further effectively reduce the content of sodium and the total content of calcium, magnesium, and aluminum due to the coagulant or the like contained in the obtained carboxyl group-containing nitrile rubber, the screw configuration of the screw 5 in the barrel block 40 famed with the second washing water feed port 400 is preferably configured such that the fraction occupied by the kneading disks 52 (fraction occupied in the longitudinal direction) is within a range from 0% to 100% and more preferably configured such that the fraction occupied by the kneading disks 52 is within a range from 70% to 100%.

The above-described embodiment has been exemplified as a form in which the barrel block 32 is provided with the feed port 320 for supplying the latex of carboxyl group-containing nitrile rubber, the feed port 321 for supplying the coagulant, and the feed port 322 for supplying water vapor, but another form may be adopted in which, for example, the barrel block 31 or the barrel block 32 is provided with these feed ports (i.e., feed ports for supplying the latex of carboxyl group-containing nitrile rubber, the coagulant, and the water vapor).

Furthermore, the above-described embodiment has been exemplified as a form in which when the latex of carboxyl group-containing nitrile rubber is coagulated in the extruder 1, the latex of carboxyl group-containing nitrile rubber, the coagulant, and the water vapor are supplied from the feed ports 320, 321, and 322, but in another form, the coagulation may be performed by supplying only the latex of carboxyl group-containing nitrile rubber and the coagulant without supplying water vapor.

Rubber Composition

Then, the carboxyl group-containing nitrile rubber recovered in this way can be used as a rubber composition, for example, by blending a cross-linking agent. The cross-linking agent is not particularly limited, but a polyamine-based cross-linking agent can be preferably used from the viewpoint of further enhancing the compression set resistance in the obtained cross-linked rubber. The content of the cross-linking agent in the rubber composition of the present invention is not particularly limited, but is preferably 0.1 to 20 parts by weight, more preferably 0.2 to 15 parts by weight, and further preferably 0.5 to 10 parts by weight with respect to 100 parts by weight of the carboxyl group-containing nitrile rubber.

In addition, other than the cross-linking agent, a compounding agent commonly used in the rubber field may be blended to the rubber composition of the present invention. Examples of such a compounding agent include fillers, metal oxides such as zinc oxide and magnesium oxide, α,β-ethylenically unsaturated carboxylic acid metal salts such as zinc methacrylate and zinc acrylate, cross-linking accelerators, co-cross-linking agents, cross-linking aids, cross-linking retarders, antiaging agents, antioxidants, light stabilizers, scorch inhibitors such as primary amine, activators such as diethylene glycol, silane coupling agents, plasticizers, processing aids, glidants, pressure-sensitive adhesives, lubricants, flame retardants, antifungal agents, acid receiving agents, antistatic agents, pigments, forming agents, and the like. The blending amounts of these compounding agents are not particularly limited and the compounding agents can be blended in the amounts according to the compounding purposes so long as the amounts are within ranges not impairing the object and the effects of the present invention.

Furthermore, the rubber composition of the present invention may contain rubber other than the carboxyl group-containing nitrile rubber.

Cross-Linked Rubber

The above-described rubber composition can be made into a cross-linked rubber by cross-linking.

The cross-linked rubber of the present invention can be produced as follows: the rubber composition of the present invention is used, the composition is formed by using a forming machine corresponding to the desired shape, such as an extruder, an injection molding machine, a compressor, or a roll, the cross-linking reaction is performed by heating the formed product, and thus the shape of the formed product is fixed as a cross-linked product. In this case, the cross-linking may be performed after preliminarily performing the forming, or alternatively, the forming and the cross-linking may be performed simultaneously. The forming temperature is usually 10° C. to 200° C. and preferably 25° C. to 120° C. The cross-linking temperature is usually 100° C. to 200° C. and preferably 130° C. to 190° C., and the cross-linking time is usually 1 minute to 24 hours and preferably 2 minutes to 1 hour.

Depending on the shape, size, etc. of the cross-linked product, even when the surface is cross-linked, the product may not be sufficiently cross-linked to the inside, and secondary cross-linking may therefore be performed by further heating. A general method used for cross-linking rubber may be appropriately selected as the heating method, such as press heating, steam heating, oven heating, and hot air heating.

The cross-linked rubber of the present invention is obtained using the rubber composition which contains the above-described carboxyl group-containing nitrile rubber of the present invention, and is therefore excellent in the water resistance (in particular, LLC solution resistance) and the compression set resistance. In this regard, the cross-linked rubber can be used for sealing materials, gaskets, rolls, belts, hoses, boots, damping materials of rubber components, dust covers, automobile interior members, friction materials, tires, coated cables, soles, electromagnetic wave shields, adhesives for flexible printed boards and the like, and fuel cell separators as well as for various applications in the electronics field. The cross-linked rubber of the present invention can be particularly suitably used for an application as a sealing material for sealing a container including an aqueous coolant (in particular, a long life coolant (LLC) resistant solution) (in particular, an application as a seal for a coolant such as a long life coolant (LLC)).

EXAMPLES

Hereinafter, the present invention will be described more specifically by way of Examples and Comparative Examples. Unless otherwise stated, "parts" in each example are parts by weight.

Various physical properties were evaluated in accordance with the following methods.

Content Ratio of Each Monomer Unit Constituting Carboxyl Group-Containing Nitrile Rubber The content ratio of the mono-n-butyl maleate unit was calculated as follows. To 0.2 g of a 2-mm square piece of the carboxyl group-containing nitrile rubber, 100 mL of 2-butanone was added. The mixture was stirred for 16 hours, and then 20 mL of ethanol and 10 mL of water were added to the mixture. While stirring, a titration was performed at room temperature by using a 0.02 N hydrous ethanol solution of potassium hydroxide and thymolphthalein as an indicator, and thus the number of moles of the carboxyl group with respect to 100 g of the carboxyl group-containing nitrile rubber was determined. Then, the determined number of moles was converted into the content of the mono-n-butyl maleate unit.

The content ratios of the 1,3-butadiene unit and saturated butadiene unit were calculated by measuring the iodine values before and after the hydrogenation reaction (in accordance with JIS K 6235) using the carboxyl group-containing nitrile rubber.

The content ratio of the acrylonitrile unit was calculated by measuring the nitrogen content in the carboxyl group-containing nitrile rubber using the Kjeldahl method in accordance with JIS K6384.

The content ratios of the n-butyl acrylate unit and 2-methoxyethyl acrylate unit were calculated as the remaining components for the above monomer units.

Moony Viscosity of Carboxyl Group-Containing Nitrile Rubber

The Mooney viscosity (ML1+4, 100° C.) of the carboxyl group-containing nitrile rubber was measured at 100° C. in accordance with JIS K6300.

Storage Elastic Modulus of Carboxyl Group-Containing Nitrile Rubber G'

For the carboxyl group-containing nitrile rubber, the storage elastic modulus G' was measured using a dynamic viscoelasticity measuring apparatus: trade name "RPA2000" (available from Alpha Technologies). Specifically, the carboxyl group-containing nitrile rubber was cut into pieces in accordance with the shape of the die 4, the pieces were stacked so as to be about 5 g, and the stack was used as a measurement sample, for which the storage elastic modulus G' (140° C.) at a temperature of 140° C. was measured under the conditions of a dynamic shear strain of 6.98% and a frequency of 91 Hz (shear velocity of 40 s$^{-1}$).

Amount of Methyl Ethyl Ketone Insoluble Content

After 200 mg of the carboxyl group-containing nitrile rubber was accurately weighed, immersed in 100 ml of methyl ethyl ketone, and placed still at 25° C. for 24 hours, the carboxyl group-containing nitrile rubber was filtered through an 80 mesh stainless metal mesh, the insoluble content in a swollen state remaining on the metal mesh was dried by volatilizing the solvent, and the weight after drying was accurately weighed. Then, the ratio (wt %) of the weight of the insoluble content after drying to the weight before immersion in the methyl ethyl ketone was calculated, and this was determined as the amount of methyl ethyl ketone insoluble content.

Content of Sodium and Total Content of Calcium, Magnesium, and Aluminum in Carboxyl Group-Containing Nitrile Rubber Nitric acid was added to the carboxyl group-containing nitrile rubber, which was decomposed in a microwave and then appropriately diluted. After that, for the diluted liquid thus obtained, the content of sodium and the total content of calcium, magnesium, and aluminum were measured by an internal standard calibration curve method using ICP-AES (ICPE-9000: available from Shimadzu Corporation).

Increase Value of Die Pressure

When the recovery process for the carboxyl group-containing nitrile rubber was performed by the extruder 1, the increase value of the pressure on the metal mesh (opening of about 0.13 mm) attached to the die 4 was measured. Then, through dividing the measured increase value of the pressure by the processing amount of the extruder 1 and the discharge port area of the die 4, the unit amount and the increase value of the die pressure per unit volume (kPa/(kg·cm²)) were measured.

Mold Contamination Resistance

The method of evaluating the mold contamination resistance was as follows. Approximately 65 g of a test piece was prepared from the uncross-linked rubber composition. This was interposed between a set of 150×80×2 mm molds for a sheet. After pressing at 170° C. with a pressure of 9 to 10 MPa for 30 minutes, contamination on the mold surface (situation of the mold contamination with the attached rubber and the residual sub-materials in the rubber) was visually determined. By observing the mold contamination resistance against the uncross-linked rubber composition, it can be an index of the mold contamination when making the cross-linked rubber.

A: No contamination
B: Almost no contamination
C: Some contamination present
D: Serious contamination present LLC Resistance After the rubber composition was placed in a mold having a length of 15 cm, a width of 15 cm, and a depth of 0.2 cm and press-molded at 170° C. for 20 minutes while being pressurized at a press pressure of 10 MPa, the rubber composition was subjected to secondary cross-linking at 170° C. for 4 hours to obtain a sheet-shaped cross-linked rubber. Then, the obtained sheet-shaped cross-linked rubber was immersed in a Long Life Coolant (LLC) solution at a temperature of 125° C. for 168 hours. Then, the degree of swelling after immersion in the LLC solution was obtained in accordance with the following formula. It can be said that the lower the swelling ratio after immersion in the LLC solution, the more excellent the water resistance and the LLC resistance.

(Swelling degree after immersion in LLC solution (%))=((Volume of cross-linked rubber after immersion in LLC solution)−(Volume of cross-linked rubber before immersion in LLC solution))±(Volume of cross-linked rubber before immersion in LLC solution)×100

Compressive Set (O-Ring Compression Set)

An O-ring-shaped test piece was obtained through cross-linking the rubber composition at 170° C. with a press pressure of 10 MPa for 20 minutes using a mold having an inner diameter of 30 mm and a ring diameter of 3 mm and then performing secondary cross-linking at 170° C. for 4 hours. Then, using the obtained O-ring-shaped test piece, the compression set was measured in accordance with JIS K6262 under a condition of holding the test piece at 150° C. for 168 hours in a state in which the distance between two planes interposing the test piece was compressed by 25% in the ring thickness direction. The smaller this value, the more excellent the compression set resistance.

Production Example 1, Production of Latex of Carboxyl Group-Containing Nitrile Rubber (L1)

In a metallic bottle, 180 parts of ion exchanged water, 25 parts of an aqueous solution of sodium dodecylbenzenesulfonate having a concentration of 10 wt %, 5 parts of a sodium salt of a formalin condensate of naphthalenesulfonate having a concentration of 10%, 20 parts of acrylonitrile, 5 parts of mono-n-butyl maleate, 31 parts of n-butyl acrylate, and 0.75 parts of t-dodecyl mercaptan (molecular weight adjuster) were added in this order, the gas inside the metallic bottle was replaced with nitrogen three times, and then 44 parts of 1,3-butadiene was charged into the metallic bottle. The metallic bottle was held at 10° C., 0.1 parts of cumene hydroperoxide (polymerization initiator) was charged into the metallic bottle, the polymerization reaction was continued while stirring, and when the polymerization conversion rate reached 80%, 4 parts of 2,2,6,6-tetramethylpiperidin-1-oxyl aqueous solution (polymerization terminator) having a concentration of 2.5 wt % was added to terminate the polymerization reaction. Then, the residual monomers were removed at a water temperature of 60° C., and latex of copolymer (X1) (solid content concentration of 25 wt %) was obtained.

Then, in an autoclave, the latex of copolymer (X1) obtained as above and a palladium catalyst (a solution obtained by mixing 1 wt % palladium acetate solution with the equal weight of ion-exchanged water) were added in such a way that the content of palladium was 1000 ppm by weight with respect to the dry weight of the rubber contained in the latex of copolymer (X1) obtained as above, then, a hydrogenation reaction was performed at a hydrogen pressure of 3 MPa and a temperature of 50° C. for 6 hours, and an appropriate amount of an antiaging agent was added to obtain latex of carboxyl group-containing nitrile rubber (L1) (solid content concentration: 11.7 wt %). The composition of the carboxyl group-containing nitrile rubber contained in the obtained latex of carboxyl group-containing nitrile rubber (L1) was 20.5 wt % of the acrylonitrile unit, 45.5 wt % of the 1,3-butadiene unit (including the saturated portion), 4.5 wt % of the mono n-butyl maleate, and 29.5 wt % of the n-butyl acrylate, and the iodine value was 11.

Production Example 2, Production of Latex of Carboxyl Group-Containing Nitrile Rubber (L2)

Latex of carboxyl group-containing nitrile rubber (L2) (solid content concentration: 11.7 wt %) was obtained in the same manner as in Production Example 1 except that the amount of acrylonitrile used was 16 parts, the amount of n-butyl acrylate used was 36 parts, the amount of mono-n-butyl maleate used was 5 parts, and the amount of 1,3-butadiene used was 44 parts. The composition of the carboxyl group-containing nitrile rubber contained in the obtained latex of carboxyl group-containing nitrile rubber (L2) was 16.5 wt % of the acrylonitrile unit, 54.8 wt % of the 1,3-butadiene unit (including the saturated portion), 4.5 wt % of the mono n-butyl maleate, and 34.2 wt % of the n-butyl acrylate, and the iodine value was 9.

Production Example 3, Production of Latex of Carboxyl Group-Containing Nitrile Rubber (L3)

Latex of carboxyl group-containing nitrile rubber (L3) (solid content concentration: 11.7 wt %) was obtained in the same manner as in Production Example 1 except that the amount of acrylonitrile used was 21 parts, the amount of n-butyl acrylate used was 31 parts, the amount of mono-n-butyl maleate used was 5 parts, the amount of 1,3-butadiene used was 43 parts, the amount of t-dodecyl mercaptan (molecular weight adjuster) used was 0.70 parts, and the polymerization terminator was added when the polymerization conversion rate reached 85%. The composition of the carboxyl group-containing nitrile rubber contained in the obtained latex of carboxyl group-containing nitrile rubber (L2) was 21.4 wt % of the acrylonitrile unit, 44.3 wt % of the 1,3-butadiene unit (including the saturated portion), 4.5 wt % of the mono n-butyl maleate, and 29.8 wt % of the n-butyl acrylate, and the iodine value was 9.

Example 1

The latex of carboxyl group-containing nitrile rubber (L1) obtained in Production Example 1 was adjusted to pH=3.5 using a sulfuric acid aqueous solution, and the carboxyl group-containing nitrile rubber was recovered through coagulating, washing, dewatering, and drying the latex of carboxyl group-containing nitrile rubber (L1) with the extruder 1 illustrated in FIG. 1 using a sodium chloride aqueous solution (concentration: 25 wt %) as the coagulation liquid and water vapor.

A biaxial meshing type screw extruder was used as the extruder 1. The biaxial meshing type screw extruder is in a state in which two screws (cylinder diameter=47 mm, L/Da=63) 5 and 5 are provided in parallel in the barrel 3, these screws 5 and 5 are rotationally driven in the same direction, the crest portions of one screw are meshed with the root portions of the other screw, and the root portions of the one screw are meshed with the crest portions of the other screw.

The axial screw length L1 of the region corresponding to the coagulation zone 100 was set to 931 mm, the axial screw length L2 of the region corresponding to the drainage zone 102 was set to 161 mm, the axial screw length L3 of the region corresponding to the washing/dewatering zone 104 was set to 678 mm, and the axial screw length L4 of the region corresponding to the drying zone 106 was set to 1058 mm.

In Example 1, a screw configuration α listed in Table 1 below was adopted for the two screws 5 and 5, and the set temperature of each barrel block was a temperature "a" listed in Table 2 below.

TABLE 1

|  | Barrel block 38 | Barrel block 40 |
|---|---|---|
| Screw configuration α | BAAAAC | DDDDDD |
| Screw configuration β | BAAAAC | BAAACC |
| Screw configuration γ | DBDDCC | BAAACC |
| Screw configuration δ | DBDDCC | DDDDDD |
| Screw configuration ε | BAAAAC | DDDDDD |
| Screw configuration ζ | DDBBCC | DBDDDD |

TABLE 2

|  | Barrel blocks 34 to 36 | Barrel blocks 41 to 43 | Barrel blocks 44 to 46 |
|---|---|---|---|
| Temperature a | 90° C. | 140° C. | 120 to 130° C. |
| Temperature b | 90° C. | 160° C. | 140° C. |
| Temperature c | 30° C. | 140° C. | 120 to 130° C. |

In Table 1, "A" represents forward feed kneading disks, "B" represents neutral kneading disks, "C" represents backward feed kneading disks, and "D" represents a full-flight screw.

As can be confirmed from Table 1, in the screw configuration α, the screw configuration in the portion corresponding to the first washing water feed port 380 is composed of a plurality of kneading disks. In the screw configuration α, the fraction occupied by the kneading disks of the screw in the barrel block 38 (fraction occupied in the longitudinal direction) is 100%.

From the feed port 320 provided in the barrel block 32 of the extruder 1 having such a configuration, the latex of carboxyl group-containing nitrile rubber (L1) (solid content concentration: 11.7 wt %) adjusted to pH=3.5 was started to be continuously supplied at a rate of 345 kg/hr. At the same time, from the feed port 321 provided in the barrel block 32, a sodium chloride aqueous solution (coagulant concentration: 25 wt %) was started to be continuously supplied at a rate of 112 kg/hr, and from the feed port 322 provided in the barrel block 32, water vapor was started to be continuously supplied at a pressure of 0.35 MPa and a rate of 65 kg/hr. That is, the concentration of the coagulant with respect to the total amount of serum water when passing through the feed port 321 (amount of sodium chloride/amount of serum water composed of the total supply) was set to 5.4 wt %, or the amount of sodium chloride was set to 70 parts per 100 parts of the carboxyl group-containing nitrile rubber. At the same time, from the first washing water feed port 380 provided in the barrel block 38, the washing water was started to be continuously supplied under a condition of 180 L/hr, and the carboxyl group-containing nitrile rubber was continuously recovered at a rate of 41 kg/hr by operating the extruder 1 at a screw rotation speed of 200 μm to continuously coagulate, wash, dewater, and dry the latex of carboxyl group-containing nitrile rubber (L1). In this operation, the increase value of the die pressure was measured in accordance with the above method. The results are listed in Table 3.

Then, for the recovered carboxyl group-containing nitrile rubber, the Mooney viscosity, the storage elastic modulus G' (140° C.), the amount of methyl ethyl ketone insoluble content, the content of sodium, and the total content of calcium, magnesium, and aluminum were measured in accordance with the above methods. The results are listed in Table 3. All of these evaluations were made by sampling and measuring the samples before passing through the metal mesh attached to the die 4 and the die 4. It can be determined that these evaluation results are substantially not different before and after passing through the metal mesh attached to the die 4 and the die 4.

Then, 100 parts of MT carbon (available from Cancarb Limited, trade name "Theimax MT," thermal black), 20 parts of trimellitic acid tri-2-ethylhexyl (available from ADEKA CORPORATION, trade name "Adekacizer C-8," plasticizer), 1.5 parts of 4,4'-di-(α,α-dimethylbenzyl)diphenylamine (available from OUCHI SHINKO CHEMICAL INDUSTRIAL CO., LTD., trade name "NOCRAC CD," anti-aging agent), 1 part of stearic acid, and 1 part of polyoxyethylene alkyl ether phosphoric acid ester (available from TOHO Chemical Industry Co., Ltd., trade name "Phosphanol RL210", processing aid) were added to 100 parts of the carboxyl group-containing nitrile rubber recovered as above and mixed at 50° C. for 5 minutes using a Banbury mixer. Then, the obtained mixture was transferred to a roll at 50° C., and 4 parts of a mixture of a dicyclohexylamine salt of ethylene glycol and a long-chain alcohol (available from OUCHI SHINKO CHEMICAL INDUSTRIAL CO., LTD., trade name "Nocmaster EGS," composed of 80 wt % of dicyclohexylamine salt of ethylene glycol and 20 wt % of long-chain alcohol (1-tetradecanol, 1-hexadecanol, 1-octadecanol), basic cross-linking accelerator) and 2.2 parts of hexamethylenediamine carbamate (available from DuPont Dow Elastomers, trade name "Diak #1," polyamine cross-linking agent belonging to aliphatic polyvalent amines) were blended and kneaded with the above obtained mixture to obtain a rubber composition.

Then, using the obtained rubber composition, the mold contamination resistance, the LLC resistance, and the compression set (O-ring compression set) were evaluated in accordance with the above methods. The results are listed in Table 3.

Example 2

In Example 2, the extruder 1 having the same configuration as in Example 1 was used except that the screw configuration was the screw configuration β listed in Table 1 and the extruder 1 further had the second washing water feed port 400 provided in the barrel block 40 in addition to the first washing water feed port 380 provided in the barrel block 38. In Example 2, the extruder 1 having such a configuration was used, and the carboxyl group-containing nitrile rubber was continuously recovered at a rate of 41 kg/hr by operating the extruder 1 to continuously coagulate, wash, dewater, and dry the latex of carboxyl group-containing nitrile rubber (L1) in the same manner as in Example 1 except that the washing water was continuously supplied at a supply rate of 160 L/hr as the total amount of the washing water from the first washing water feed port 380 and the second washing water feed port 400. In Example 2, the latex of carboxyl group-containing nitrile rubber (L1) adjusted to pH=3.3 (solid content concentration: 11.7 wt %) was used. Then, the recovered carboxyl group-containing nitrile rubber was evaluated in the same manner as in Example 1. The results are listed in Table 3.

In the screw configuration R, as can be confirmed from Table 1, the screw configurations in the portions corresponding to the first washing water feed port 380 and the second washing water feed port 400 are each composed of a plurality of the kneading disks, and the fraction occupied by the kneading disks of the screw in the barrel block 38 (fraction occupied in the longitudinal direction) is 100% while the fraction occupied by the kneading disks of the screw in the barrel block 40 (fraction occupied in the longitudinal direction) is 99%.

Example 3

In Example 3, the extruder 1 having the same configuration as in Example 1 was used except that the barrel block 33 had three feed ports and the extruder 1 further had the second washing water feed port 400 provided in the barrel block 40 in addition to the first washing water feed port 380 provided in the barrel block 38, but the screw configuration was the screw configuration α listed in Table 1. In Example 3, the extruder 1 having such a configuration was used, and the carboxyl group-containing nitrile rubber was continuously recovered at a rate of 41 kg/hr by operating the extruder 1 to continuously coagulate, wash, dewater, and dry the latex of carboxyl group-containing nitrile rubber (L1) in the same manner as in Example 1 except that the three feed ports provided in the barrel block 33 were used to supply the latex of carboxyl group-containing nitrile rubber (L1), the sodium chloride aqueous solution, and the water vapor and the washing water was continuously supplied at a supply rate of 260 L/hr as the total amount of the washing water from the first washing water feed port 380 and the second washing water feed port 400. In Example 3, the latex of carboxyl group-containing nitrile rubber (L1) adjusted to pH=3.2 (solid content concentration: 11.7 wt %) was used.

Then, the recovered carboxyl group-containing nitrile rubber was evaluated in the same manner as in Example 1. The results are listed in Table 3.

Example 4

In Example 4, the extruder 1 having the same configuration as in Example 1 was used except that the screw configuration was the screw configuration γ listed in Table 1 and the extruder 1 further had the second washing water feed port 400 provided in the barrel block 40 in addition to the first washing water feed port 380 provided in the barrel block 38. In Example 4, the extruder 1 having such a configuration was used, and the carboxyl group-containing nitrile rubber was continuously recovered at a rate of 41 kg/hr by operating the extruder 1 to continuously coagulate, wash, dewater, and dry the latex of carboxyl group-containing nitrile rubber (L1) in the same manner as in Example 1 except that the washing water was continuously supplied at a supply rate of 260 L/hr as the total amount of the washing water from the first washing water feed port 380 and the second washing water feed port 400. In Example 4, the latex of carboxyl group-containing nitrile rubber (L1) adjusted to pH=3.5 (solid content concentration: 11.7 wt %) was used. Then, the recovered carboxyl group-containing nitrile rubber was evaluated in the same manner as in Example 1. The results are listed in Table 3.

In the screw configuration γ, as can be confirmed from Table 1, the screw configuration in the portion corresponding to the first washing water feed port 380 is not composed of a plurality of the kneading disks, but the screw configuration in the portion corresponding to the second washing water feed port 400 is composed of a plurality of the kneading disks, and the fraction occupied by the kneading disks of the screw in the barrel block 40 (fraction occupied in the longitudinal direction) is 99%.

Example 5

In Example 5, the extruder 1 having the same configuration as in Example 1 was used except that the screw configuration was the screw configuration β listed in Table 1 and the extruder 1 had the second washing water feed port 400 provided in the barrel block 40 as substitute for the first washing water feed port 380 provided in the barrel block 38. In Example 5, the extruder 1 having such a configuration was used, and the carboxyl group-containing nitrile rubber was continuously recovered at a rate of 41 kg/hr by operating the extruder 1 to continuously coagulate, wash, dewater, and dry the latex of carboxyl group-containing nitrile rubber (L1) in the same manner as in Example 1 except that the washing water was continuously supplied at a supply rate of 80 L/hr from the second washing water feed port 400. In Example 5, the latex of carboxyl group-containing nitrile rubber (L1) adjusted to pH=3.8 (solid content concentration: 11.7 wt %) was used. Then, the recovered carboxyl group-containing nitrile rubber was evaluated in the same manner as in Example 1. The results are listed in Table 3.

Example 6

In Example 6, the extruder 1 having the same configuration as in Example 1 was used except that the barrel block 33 had three feed ports and the screw configuration was the screw configuration β listed in Table 1. In Example 6, the extruder 1 having such a configuration was used, and the carboxyl group-containing nitrile rubber was continuously recovered at a rate of 41 kg/hr by operating the extruder 1 to continuously coagulate, wash, dewater, and dry the latex of carboxyl group-containing nitrile rubber (L1) in the same manner as in Example 1 except that the three feed ports provided in the barrel block 33 were used to supply the latex of carboxyl group-containing nitrile rubber (L1), the sodium chloride aqueous solution, and the water vapor and the washing water was continuously supplied at a supply rate of 180 L/hr from the first washing water feed port 380. In Example 6, the latex of carboxyl group-containing nitrile rubber (L1) adjusted to pH=3.2 (solid content concentration: 11.7 wt %) was used. Then, the recovered carboxyl group-containing nitrile rubber was evaluated in the same manner as in Example 1. The results are listed in Table 3.

Example 7

In Example 7, the extruder 1 having the same configuration as in Example 1 was used except that the screw configuration was the screw configuration γ listed in Table 1 and the extruder 1 had the second washing water feed port 400 provided in the barrel block 40 as substitute for the first washing water feed port 380 provided in the barrel block 38. In Example 7, the extruder 1 having such a configuration was used, and the carboxyl group-containing nitrile rubber was continuously recovered at a rate of 41 kg/hr by operating the extruder 1 to continuously coagulate, wash, dewater, and dry the latex of carboxyl group-containing nitrile rubber (L1) in the same manner as in Example 1 except that the washing water was continuously supplied at a supply rate of 80 L/hr from the second washing water feed port 400. In Example 7, the latex of carboxyl group-containing nitrile rubber (L1) adjusted to pH=3.2 (solid content concentration: 11.7 wt %) was used. Then, the recovered carboxyl group-containing nitrile rubber was evaluated in the same manner as in Example 1. The results are listed in Table 3.

Example 8

Except that the latex of carboxyl group-containing nitrile rubber (L2) (solid content concentration: 11.7 wt %) obtained in Production Example 2 and adjusted to pH=3.3 was used as substitute for the latex of carboxyl group-containing nitrile rubber (L1) obtained in Production Example 1, the carboxyl group-containing nitrile rubber was continuously recovered at a rate of 41 kg/hr by operating the extruder 1 to continuously coagulate, wash, dewater, and dry the latex of carboxyl group-containing nitrile rubber (L2) in the same manner as in Example 1. Then, the recovered carboxyl group-containing nitrile rubber was evaluated in the same manner as in Example 1. The results are listed in Table 3.

Example 9

In Example 9, the extruder 1 having the same configuration as in Example 1 was used except that the barrel block 33 had three feed ports and the screw configuration was the screw configuration δ listed in Table 1. In Example 6, the extruder 1 having such a configuration was used, and the carboxyl group-containing nitrile rubber was continuously recovered at a rate of 41 kg/hr by operating the extruder 1 to continuously coagulate, wash, dewater, and dry the latex of carboxyl group-containing nitrile rubber (L1) in the same manner as in Example 1 except that the three feed ports provided in the barrel block 33 were used to supply the latex of carboxyl group-containing nitrile rubber (L1), the sodium chloride aqueous solution, and the water vapor and the washing water was continuously supplied at a supply rate of 180 L/hr from the first washing water feed port 380. In Example 9, the latex of carboxyl group-containing nitrile rubber (L1) adjusted to pH=3.6 (solid content concentration: 11.7 wt %) was used. Then, the recovered carboxyl group-containing nitrile rubber was evaluated in the same manner as in Example 1. The results are listed in Table 3.

In the screw configuration δ, as can be confirmed from Table 1, the screw configuration in the portion corresponding to the first washing water feed port 380 is composed of a plurality of the kneading disks, and the fraction occupied by the kneading disks of the screw in the barrel block 38 (fraction occupied in the longitudinal direction) is 100%.

Comparative Example 1

In Comparative Example 1, the extruder 1 having the same configuration as in Example 1 was used except that the screw configuration was the screw configuration listed in Table 1 and the extruder 1 had the second washing water feed port 400 provided in the barrel block 40 as substitute for the first washing water feed port 380 provided in the barrel block 38. In Comparative Example 1, the extruder 1 having such a configuration was used, and the carboxyl group-containing nitrile rubber was continuously recovered at a rate of 41 kg/hr by operating the extruder 1 to continuously coagulate, wash, dewater, and dry the latex of carboxyl group-containing nitrile rubber (L1) in the same manner as in Example 1 except that the washing water was continuously supplied at a supply rate of 80 L/hr from the second washing water feed port 400. In Comparative Example 1, the latex of carboxyl group-containing nitrile rubber (L1) adjusted to pH=3.4 (solid content concentration: 11.7 wt %) was used. Then, the recovered carboxyl group-containing nitrile rubber was evaluated in the same manner as in Example 1. The results are listed in Table 3.

In the screw configuration ε, as can be confirmed from Table 1, the screw configuration in the portion corresponding to the second washing water feed port 400 is composed of one or more screw blocks rather than a plurality of the kneading disks.

Comparative Example 2

In Comparative Example 2, the extruder 1 having the same configuration as in Example 1 was used except that the screw configuration was the screw configuration listed in Table 1 and the extruder 1 had the second washing water feed port 400 provided in the barrel block 40 as substitute for the first washing water feed port 380 provided in the barrel block 38. In Comparative Example 2, the extruder 1 having such a configuration was used, and the carboxyl group-containing nitrile rubber was continuously recovered at a rate of 41 kg/hr by operating the extruder 1 to continuously coagulate, wash, dewater, and dry the latex of carboxyl group-containing nitrile rubber (L1) in the same manner as in Example 1 except that a calcium chloride aqueous solution (coagulant concentration: 2 wt %) was used as substitute for the sodium chloride aqueous solution, the supply rate of the calcium chloride aqueous solution was set so as to correspond to an amount of 5 parts of the calcium chloride per 100 parts of the carboxyl group-containing nitrile rubber, and the washing water was continuously supplied at a supply rate of 180 L/hr from the second washing water feed port 400. In Comparative Example 2, the latex of carboxyl group-containing nitrile rubber (L1) adjusted to pH=3.8

(solid content concentration: 11.7 wt %) was used. Then, the recovered carboxyl group-containing nitrile rubber was evaluated in the same manner as in Example 1. The results are listed in Table 3.

In the screw configuration as can be confined from Table 1, the screw configuration in the portion corresponding to the second washing water feed port 400 is composed of one or more screw blocks rather than a plurality of the kneading disks.

Comparative Example 3

In Comparative Example 3, the extruder 1 having the same configuration as in Example 1 was used except that the barrel block 35 had three feed ports, the screw configuration was the screw configuration β listed in Table 1, and the extruder 1 further had the second washing water feed port 400 provided in the barrel block 40 in addition to the first washing water feed port 380 provided in the barrel block 38. In addition, the temperature of the extruder 1 was set to temperature "b" listed in Table 2. In Comparative Example 3, the extruder 1 having such a configuration was used, and the carboxyl group-containing nitrile rubber was continuously recovered at a rate of 41 kg/hr by operating the extruder 1 to continuously coagulate, wash, dewater, and dry the latex of carboxyl group-containing nitrile rubber (L1) in the same manner as in Example 1 except that the three feed ports provided in the barrel block 35 were used to supply the latex of carboxyl group-containing nitrile rubber (L1), the sodium chloride aqueous solution, and the water vapor and the washing water was continuously supplied at a supply rate of 260 L/hr as the total amount of the washing water from the first washing water feed port 380 and the second washing water feed port 400. In Comparative Example 3, the latex of carboxyl group-containing nitrile rubber (L1) adjusted to pH=3.4 (solid content concentration: 11.7 wt %) was used. Then, the recovered carboxyl group-containing nitrile rubber was evaluated in the same manner as in Example 1. The results are listed in Table 3.

Comparative Example 4

In Comparative Example 4, the extruder 1 having the same configuration as in Example 1 was used except that the barrel block 33 had three feed ports and the extruder 1 had the second washing water feed port 400 provided in the barrel block 40 as substitute for the first washing water feed port 380 provided in the barrel block 38, but the screw configuration was the screw configuration α listed in Table 1. In addition, the temperature of the extruder 1 was set to temperature "c" listed in Table 2. In Comparative Example 4, the extruder 1 having such a configuration was used, and except that the latex of carboxyl group-containing nitrile rubber (L3) (solid content concentration: 11.7 wt %) obtained in Production Example 3 and adjusted to pH=3.8 was used as substitute for the latex of carboxyl group-containing nitrile rubber (L1) obtained in Production Example 1, the three feed ports provided in the barrel block 33 were used to supply the latex of carboxyl group-containing nitrile rubber (L3), the sodium chloride aqueous solution, and the water vapor, and the washing water was continuously supplied at a supply rate of 80 L/hr from the second washing water feed port 400, the carboxyl group-containing nitrile rubber was continuously recovered at a rate of 41 kg/hr by operating the extruder 1 to continuously coagulate, wash, dewater, and dry the latex of carboxyl group-containing nitrile rubber (L3) in the same manner as in Example 1. Then, the recovered carboxyl group-containing nitrile rubber was evaluated in the same manner as in Example 1. The results are listed in Table 3.

Comparative Example 5

In Comparative Example 5, the extruder 1 having the same configuration as in Example 1 was used except that the first washing water feed port 380 was not provided in the barrel block 38, but the screw configuration was the screw configuration α listed in Table 1. In Comparative Example 5, the extruder 1 having such a configuration was used, and except that the latex of carboxyl group-containing nitrile rubber (L2) (solid content concentration: 11.7 wt %) obtained in Production Example 2 and adjusted to pH=3.4 was used as substitute for the latex of carboxyl group-containing nitrile rubber (L1) obtained in Production Example 1 and the washing water was not supplied in the washing/dewatering zone 104, the carboxyl group-containing nitrile rubber was continuously recovered at a rate of 41 kg/hr by operating the extruder 1 to continuously coagulate, wash, dewater, and dry the latex of carboxyl group-containing nitrile rubber (L1) in the same manner as in Example 1. Then, the recovered carboxyl group-containing nitrile rubber was evaluated in the same manner as in Example 1. The results are listed in Table 3.

Comparative Example 6

In Comparative Example 6, the extruder 1 having the same configuration as in Example 1 was used except that the first washing water feed port 380 was not provided in the barrel block 38, but the screw configuration was the screw configuration α listed in Table 1. In Comparative Example 6, the extruder 1 having such a configuration was used, and the carboxyl group-containing nitrile rubber was continuously recovered at a rate of 41 kg/hr by operating the extruder 1 to continuously coagulate, wash, dewater, and dry the latex of carboxyl group-containing nitrile rubber (L1) in the same manner as in Example 1 except that the washing water was not supplied in the washing/dewatering zone 104. In Comparative Example 6, the latex of carboxyl group-containing nitrile rubber (L1) (solid content concentration: 11.7 wt %) adjusted to pH=3.8 was used. Then, the recovered carboxyl group-containing nitrile rubber was evaluated in the same manner as in Example 1. The results are listed in Table 3.

Comparative Example 7

In Comparative Example 7, the extruder 1 having the same configuration as in Example 1 was used except that the screw configuration was the screw configuration γ listed in Table 1. In Comparative Example 7, the extruder 1 having such a configuration was used, and the carboxyl group-containing nitrile rubber was continuously recovered at a rate of 41 kg/hr by operating the extruder 1 to continuously coagulate, wash, dewater, and dry the latex of carboxyl group-containing nitrile rubber (L1) in the same manner as in Example 1 except that the supply rate of the sodium chloride aqueous solution was set so as to correspond to an amount of 100 parts of the sodium chloride per 100 parts of the carboxyl group-containing nitrile rubber and the washing water was continuously supplied at a supply rate of 80 L/hr from the first washing water feed port 380. In Comparative Example 7, the latex of carboxyl group-containing nitrile rubber (L1) adjusted to pH=3.7 (solid content concentration: 11.7 wt %) was used. Then, the recovered carboxyl group-containing nitrile rubber was evaluated in the same manner as in Example 1. The results are listed in Table 3.

[Table 3]

TABLE 3

|  | Examples | | | | | | | |
|---|---|---|---|---|---|---|---|---|
|  | 1 | 2 | 3 | 4 | 5 | 6 | 7 | 8 |
| Type of latex used for recovery | L1 | L1 | L1 | L1 | L1 | L1 | L1 | L2 |
| pH of latex used for recovery | 3.5 | 3.3 | 3.2 | 3.5 | 3.8 | 3.2 | 3.2 | 3.3 |
| Amount of coagulant per 100 parts of rubber [parts] | 70 | 70 | 70 | 70 | 70 | 70 | 70 | 70 |
| Screw configuration of barrel blocks 38, 40 | α | β | α | γ | β | β | γ | α |
| Temperature condition of barrel blocks | a | a | a | a | a | a | a | a |
| Feel position of latex | Barrel block 32 | Barrel block 32 | Barrel block 33 | Barrel block 32 | Barrel block 32 | Barrel block 33 | Barrel block 32 | Barrel block 32 |
| Supply of washing water from first washing water feed port 380 | Supplied | Supplied | Supplied | Supplied | Not supplied | Supplied | Not supplied | Supplied |
| Supply of washing water from second washing water feed port 400 | Not supplied | Supplied | Supplied | Supplied | Supplied | Not supplied | Supplied | Not supplied |
| Total amount of washing water from washing water feed port(s) 380, 400 [L/hr] | 180 | 160 | 260 | 260 | 80 | 180 | 80 | 180 |
| Evaluation of carboxyl group-containing nitrile rubber | | | | | | | | |
| Mooney viscosity (ML1 +4, 100° C. | 51.5 | 49 | 49.5 | 48.1 | 48.8 | 49.5 | 48.9 | 45.9 |
| Storage elastic modulus at 140° C. [kPa] | 379 | 392 | 385 | 378 | 381 | 384 | 370 | 390 |
| Methyl ethyl ketone insoluble content [wt %] | 27.3 | 20.9 | 23.2 | 21.9 | 22.8 | 21.7 | 23 | 17.8 |
| Sodium content [ppm by weight] | 805 | 498 | 699 | 851 | 789 | 690 | 920 | 810 |
| Total content of calcium, magnesium, and aluminum [ppm by weight] | 67 | 48 | 52 | 68 | 59 | 50 | 68 | 60 |
| Increase value of die pressure [kPa/(kg · cm$^2$)] | 0.19 | 0.14 | 0.17 | 0.18 | 0.18 | 0.17 | 0.19 | 0.19 |
| Mold contamination resistance | A | A | A | B | A | A | B | A |
| Evaluation of cross-linked rubber | | | | | | | | |
| Swelling degree when immersed in LLC (LLC resistance) [vol %] | 9 | 7 | 8 | 9 | 9 | 8 | 10 | 9 |
| Compression set [%] | 39 | 40 | 40 | 39 | 39 | 39 | 39 | 38 |

|  | Examples | Comparative Examples | | | | | | |
|---|---|---|---|---|---|---|---|---|
|  | 9 | 1 | 2 | 3 | 4 | 5 | 6 | 7 |
| Type of latex used for recovery | L1 | L1 | L1 | L1 | L3 | L2 | L1 | L1 |
| pH of latex used for recovery | 3.6 | 3.4 | 3.8 | 3.4 | 3.8 | 3.4 | 3.8 | 3.7 |
| Amount of coagulant per 100 parts of rubber [parts] | 70 | 70 | 5 | 70 | 70 | 70 | 70 | 100 |
| Screw configuration of barrel blocks 38, 40 | δ | ε | ζ | β | α | α | α | γ |
| Temperature condition of barrel blocks | a | a | a | b | c | a | a | a |
| Feel position of latex | Barrel block 33 | Barrel block 32 | Barrel block 32 | Barrel block 35 | Barrel block 33 | Barrel block 32 | Barrel block 32 | Barrel block 32 |
| Supply of washing water from first washing water feed port 380 | Supplied | Not supplied | Not supplied | Supplied | Not supplied | Not supplied | Not supplied | Supplied |
| Supply of washing water from second washing water feed port 400 | Not supplied | Supplied | Supplied | Supplied | Supplied | Not supplied | Not supplied | Not supplied |
| Total amount of washing water from washing water feed port(s) 380, 400 [L/hr] | 180 | 80 | 180 | 260 | 80 | 0 | 0 | 80 |
| Evaluation of carboxyl group-containing nitrile rubber | | | | | | | | |
| Mooney viscosity (ML1 +4, 100° C. | 50.1 | 47.1 | 46.6 | 54 | 56.2 | 48 | 52 | 50.1 |
| Storage elastic modulus at 140° C. [kPa] | 386 | 349 | 308 | 329 | 315 | 312 | 321 | 333 |
| Methyl ethyl ketone insoluble content [wt %] | 25.6 | 24.8 | 26.1 | 34.1 | 41 | 24.9 | 23.6 | 24.1 |

TABLE 3-continued

| | | | | | | | | |
|---|---|---|---|---|---|---|---|---|
| Sodium content [ppm by weight] | 798 | 2001 | 251 | 3900 | 1510 | 2543 | 2302 | 1610 |
| Total content of calcium, magnesium, and aluminum [ppm by weight] | 58 | 72 | 382 | 60 | 79 | 92 | 96 | 85 |
| Increase value of die pressure [kPa/(kg · cm$^2$)] | 0.18 | 0.32 | 0.13 | 0.35 | 0.3 | 0.38 | 0.3 | 0.27 |
| Mold contamination resistance | A | C | D | D | C | D | D | C |
| Evaluation of cross-linked rubber | | | | | | | | |
| Swelling degree when immersed in LLC (LLC resistance) [vol %] | 9 | 18 | 8 | 19 | 13 | 17 | 17 | 14 |
| Compression set [%] | 40 | 41 | 53 | 41 | 40 | 40 | 39 | 40 |

As listed in Table 3, according to the carboxyl group-containing nitrile rubber in which the content of sodium is 1500 ppm by weight or less, the total content of calcium, magnesium, and aluminum is 350 ppm by weight or less, the storage elastic modulus at 140° C. is 350 kPa or more, and the iodine value is 120 or less, the increase value of the die pressure is suppressed, the productivity of the carboxyl group-containing nitrile rubber is satisfactory, the forming efficiency is thereby high when a die or the like is used for forming, the formability (formability including the mold contamination resistance) is excellent, and a cross-linked rubber excellent in the LLC solution resistance and the compression set resistance can be given (Examples 1 to 9).

On the other hand, the carboxyl group-containing nitrile rubber in which the content of sodium is more than 1500 ppm and the storage elastic modulus at 140° C. is less than 350 kPa has a large increase value of the die pressure and a low forming efficiency when a die or the like is used for forming and is inferior in the formability (in particular, the mold contamination resistance), and the obtained cross-linked rubber is also inferior in the LLC solution resistance (Comparative Examples 1 and 3 to 7).

Moreover, the carboxyl group-containing nitrile rubber in which the storage elastic modulus at 140° C. is more than 350 kPa is inferior in the formability (in particular, the mold contamination resistance), and the obtained cross-linked rubber is also inferior in the compression set resistance (Comparative Example 2).

DESCRIPTION OF REFERENCE NUMERALS

1 Extruder
2 Drive unit
3 Barrel
31 to 48 Barrel block
380 First washing water feed port
4 Die
5 Screw

The invention claimed is:

1. A carboxyl group-containing nitrile rubber having an iodine value of 120 or less, wherein
   the carboxyl group-containing nitrile rubber does not contain a polymer flocculant,
   a content of sodium is 1500 ppm by weight or less,
   a total content of calcium, magnesium, and aluminum is 350 ppm by weight or less, and
   a storage elastic modulus at 140° C. is 350 kPa or more.

2. The carboxyl group-containing nitrile rubber according to claim 1, wherein a methyl ethyl ketone insoluble content is 40 w % or less.

3. The carboxyl group-containing nitrile rubber according to claim 1, wherein the content of sodium is 10 ppm by weight or more.

4. The carboxyl group-containing nitrile rubber according to claim 1, wherein the total content of calcium, magnesium, and aluminum is 1.5 ppm by weight or more.

5. The carboxyl group-containing nitrile rubber according to claim 1 comprising an α,β-ethylenically unsaturated nitrile monomer unit and an α,β-ethylenically unsaturated dicarboxylic acid monoester monomer unit.

6. The carboxyl group-containing nitrile rubber according to claim 5 comprising the α,β-ethylenically unsaturated nitrile monomer unit, the α,β-ethylenically unsaturated dicarboxylic acid monoester monomer unit, a conjugated diene monomer unit which includes a saturated unit thereof, and an α,β-ethylenically unsaturated monocarboxylic acid ester monomer unit.

7. A rubber composition obtained by blending a cross-linking agent with the carboxyl group-containing nitrile rubber according to claim 1.

8. A cross-linked rubber obtained by cross-linking the rubber composition according to claim 7.

* * * * *